United States Patent [19]

Muramatsu

[11] Patent Number: 5,553,201
[45] Date of Patent: Sep. 3, 1996

[54] DIGITAL IMAGE PROCESSING DEVICE FOR AUTOMATICALLY SELECTING ONE OF A PLURALITY OF DIFFERENT IMAGE ENLARGING/REDUCING MANNERS

[75] Inventor: Kiyoji Muramatsu, Nagoya, Japan

[73] Assignee: Brother Kogyo Kabushiki Kaisha, Aichi-ken, Japan

[21] Appl. No.: 441,419

[22] Filed: May 15, 1995

Related U.S. Application Data

[63] Continuation of Ser. No. 8,981, Jan. 26, 1993, abandoned.

[30] Foreign Application Priority Data

Jan. 27, 1992 [JP] Japan .................................. 4-12310
Feb. 19, 1992 [JP] Japan .................................. 4-32181
Feb. 19, 1992 [JP] Japan .................................. 4-32182

[51] Int. Cl.$^6$ ........................ G06F 15/12; G03G 13/34
[52] U.S. Cl. ........................ 395/109; 358/451; 355/207; 364/DIG. 1; 364/DIG. 2; 395/102
[58] Field of Search ........................ 395/800, 737, 395/183.08, 158, 155, 161, 900, 102, 109; 355/204, 203, 207, 206, 313, 208, 324, 209, 309, 202, 56, 55, 235, 210; 358/451, 449, 437; 364/DIG. 1, DIG. 2, 413.18; 382/298, 299

[56] References Cited

U.S. PATENT DOCUMENTS

| | | | |
|---|---|---|---|
| 4,754,303 | 6/1988 | Ito | 355/208 |
| 4,864,365 | 9/1989 | Ito | 355/207 |
| 4,872,064 | 10/1989 | Tutt et al. | 382/298 |
| 4,907,152 | 3/1990 | Lempriere | 364/413.18 |
| 5,113,251 | 5/1992 | Ichiyamgi et al. | 358/448 |
| 5,132,786 | 7/1992 | Ishiwata | 358/75 |
| 5,161,035 | 11/1992 | Muramatsu | 382/299 |
| 5,189,528 | 2/1993 | Takashima et al. | 358/448 |

*Primary Examiner*—Daniel H. Pan
*Attorney, Agent, or Firm*—Oliff & Berridge

[57] ABSTRACT

A digital image processing device is provided with a plurality of image enlarging/reducing units for processing the digital original image data in manners different from one another and enlarging or reducing the original image with a desired magnification/reduction ratio value. The digital image processing device is further provided with a selection unit for selecting one of the plurality of image enlarging/reducing units in accordance with at least one of the desired magnification/reduction ratio value and information on the original image to thereby allow the selected one of the plurality of image enlarging/reducing units to process the digital original image data in the corresponding manner to thereby enlarge or reduce the original image with the desired magnification/reduction ratio value.

23 Claims, 14 Drawing Sheets

007
DIGITAL IMAGE PROCESSING DEVICE FOR AUTOMATICALLY SELECTING ONE OF A PLURALITY OF DIFFERENT IMAGE ENLARGING/REDUCING MANNERS

This is a Continuation of Application Ser. No. 08/008,981 filed Jan. 26, 1993, now abandoned.

BACKGROUND OF THE INVENTION

1. Field of the Invention

The present invention relates to a digital image processing device capable of processing digital original image data representative of an original image to enlarge or reduce the original image.

2. Description of the Related Art

A digital image processing device is known in the field of enlarging or reducing an original image. The digital image processing device is connected to an input device for producing digital original image data representative of the original image. The digital image processing device receives the digital original image data produced by the input device and processes the original image data to thereby enlarge or reduce the original image. (The processing performed by the digital image processing device will be referred to as an "image enlarging/reducing processing", hereinafter).

The digital original image data include density data representative of the density of each of a multiplicity of picture elements which are arranged in a matrix consisting of a plurality of rows and a plurality of columns which extend perpendicularly to the rows. When the original image is a full-color image, a color at each picture element is determined by three sets of density data corresponding to three primary colors for that picture element. One example of the image enlarging/reducing processing employs an interpolation method. In order to enlarge the original image, the digital original image data for all the picture elements of the original image are subjected to an interpolation processing in which one or more new picture elements are inserted between each two adjacent original picture elements arranged in the rows and columns of the original image matrix. The original image is enlarged to a desired size, depending upon the number of the new picture elements interposed between the each adjacent two original picture elements. In order to reduce the original image, on the other hand, the digital original image data for all the picture elements are selectively subjected to the interpolation processing in which one new picture element is inserted between selected two adjacent original picture elements arranged in the rows and columns of the original image matrix. The original image is reduced to a desired size depending upon the number of the picture elements subjected to the interpolation method.

A conventional digital image processing device stores therein only a single algorithm or calculation program for performing the image enlarging/reducing processing which is determined dependently on its own hardware system. Accordingly, the conventional digital image processing device performs merely a single method of image enlarging/reducing processing for various kinds or types of digital original image data inputted from the input device.

For example, there has been proposed a digital image processing device of a type in which a single relatively simple calculation program is stored. According to the digital image processing device of this type, the digital original image data are subjected to a relatively simple image enlarging/reducing operation, so that the original image is roughly enlarged or reduced. In a concrete example of the digital image processing device of this type employing the interpolation method, the density of the new picture element to be inserted between two adjacent picture elements is determined through a relatively simple calculation of the density values of the two adjacent picture elements.

There has been also proposed a digital image processing device of another type in which a single relatively complicated calculation program is stored. According to the digital image processing device of this type, the digital original image data are subjected to a relatively complicated image enlarging/reducing operation, so that the original image is elaborately or minutely enlarged/reduced. In a concrete example of the digital image processing device of this type employing the interpolation method, the density value of the new picture element to be inserted into the selected two adjacent picture elements is determined through a relatively complicated calculation of the density values of the selected two adjacent picture elements.

In recent years, the input device has been greatly improved to produce the digital original image data representing the original image of high resolution and of high quality. In other words, the number of the digital original image data produced by the input device has been considerably increased. As a result, the data amount to be processed by the image processing device has been increased, and the processing rate of the image processing device has been greatly lowered.

For example, in the conventional digital image processing device of the type for elaborately enlarging/reducing the original image through the complicated calculation operation, if the data amount of the original image, i.e., the number of the digital original image data for the original image is large, even where the original image is to be enlarged by a small value of magnification or is to be reduced, time duration during which the enlarging/reducing processing is completed becomes long. In other words, the processing rate is lowered. Generally, the quality of the original image is not so deteriorated through the image enlarging process with the small value of magnification and through the image reducing process. Accordingly, it can be stated that the digital image processing device of this type performs unnecessary processings for the image enlarging operation with the small value of magnification and the image reducing operation.

To the contrary, in the conventional digital image processing device of the type for roughly enlarging/reducing the original image through the simple calculation operation, the time duration in which the image enlarging/reducing processing is completed is small, and therefore the processing rate is high. However, in the case where the original image is enlarged with the large value of magnification, the quality of the obtained image is greatly deteriorated. For example, the obtained image suffers from a jagging of straight or curved lines presented therein. In other words, through the image enlarging/reducing process, the straight or curved lines presented in the original image are erroneously converted into stepped lines which do not smoothly extend.

Furthermore, in recent years, the input device has been greatly improved to produce the digital original image data representative of the original image of a large size with high resolution. In this case, the number of the digital original image data produced by the input device becomes considerably large. If the digital original image data representative of the original image of the large size with the high resolution are processed by the conventional digital image processing device of the type for elaborately enlarging/reducing the original image, the period of time required for completing the image enlarging/reducing operation becomes considerably long. Accordingly, it becomes impossible to perform the image enlarging/reducing operation within a desired short period of time for the original image of the large size. On the other hand, if the digital original image data are processed by the conventional digital image processing device of the type for roughly enlarging/reducing the original image, the period of time required for completing the image enlarging/reducing operation is small. However, as described already, if the magnification value with which the original image is enlarged is high, the quality of the image obtained through the image enlarging/reducing operation is deteriorated due to the jagging phenomenon.

SUMMARY OF THE INVENTION

As the digital image processing device of the type for roughly enlarging/reducing the original image, such a digital image processing device as employing a relatively simple interpolation method has been conventionally proposed in which the density value of the new picture element to be inserted between two adjacent picture elements is determined to be equal to one of the density values of the two adjacent picture elements or to be equal to an average value of the density values of the two adjacent picture elements. As explained above, in the case where this type of digital image processing device enlarges the original image with a high value of magnification, an output image obtained through the image enlarging process suffers from the jagging phenomenon.

If the original image is an image of a type in which outlines of low degree of definition are distributed (which will be referred to as a "natural image", hereinafter) such as an original image obtained through the input device such as an image scanner from a photographic image, the jagging phenomenon occurred on the output image makes an impression quite different from that of the original image onto human's visual eyes. In other words, the image enlargement process changes or deteriorates the impression of the original illustration image. To the contrary, if the original image is an image of a type in which outlines of high degree definition are distributed (which will be referred to as an "illustration image", hereinafter) such as a computer-calculated image (which will be referred to as a "computer graphic (CG) image", hereinafter), the obtained output image makes an impression approximately the same as that of the original image onto human's visual eyes, regardless of the jagging occurred on the output image. That is, the image enlargement process does not deteriorate the impression of the original natural image.

On the other hand, as the digital image processing device of the type for elaborately enlarging/reducing the original image, such a digital image processing device as employing an intricate interpolation method can be proposed in which the density value of the new picture element to be inserted between two adjacent picture elements is determined through a curved surface interpolation method. According to the digital image processing device thus employing the curved surface interpolation method, a smoothly curved imaginary surface is first calculated to approximately satisfy the density values of the picture elements in an entire area of the original image. Then, the density value of the new picture element is calculated based on the thus calculated imaginary curved surface. In the case where the original image contains an outline part having a high definition at which the density values of the picture elements greatly change, the outline part is converted into a gradation part at which the density values of the picture elements gradually change, through the calculation of the imaginary curved surface. The density value of the new picture element to be inserted in the outline part of the original image is calculated based on the thus calculated gradation part. Accordingly, through the image enlarging process, the high definition outline part is erroneously converted into a gradation part. Thus, the definition of original image is lowered through the image enlarging process. In other words, the definition of the output image obtained through the image enlarging process is lowered relative to that of the original image.

If the original image is a natural image, even if the definition of the output image is lowered in comparison with that of the original image, the output image makes an impression approximately the same as that of the original image on the human eye. In other words, the image enlargement process does not change or deteriorate the impression of the original natural image. However, if the original image is the illustration image, if the definition of the output image is lowered in comparison with that of the original image, the output image makes an impression quite different from that of the original image on the human eye. That is, the image enlargement process deteriorates the impression of the original illustration image.

As apparent from the above description, according to the digital image processing device capable of performing merely a single image enlarging/reducing operation, it is impossible to enlarge/reduce any kind of original image without deteriorating the impression of the original image.

In view of the aforesaid drawbacks, a first object of the present invention is to provide an improved digital image processing device capable of performing an image enlarging/reducing processing with a high processing rate to obtain a high quality enlarged/reduced image regardless of the value of the magnification ratio or the reduction ratio. (The magnification ratio and the reduction ratio will be referred to as a "magnification/reduction ratio", hereinafter.)

A second object of the present invention is to provide an improved digital image processing device capable of performing an image enlarging/reducing processing with a high processing rate to obtain a high quality enlarged/reduced image regardless of the data amount (or size) of the original image.

A third object of the present invention is to provide an improved digital image processing device capable of enlarging or reducing any kind of original image without altering the impression of the original image.

To achieve the above-described objects, the present invention provides a digital image processing device for enlarging or reducing an actual original image, the digital image processing device comprising: input means for receiving actual digital original image data representative of an actual original image and a value of desired magnification/reduction ratio with which the actual original image is to be enlarged or reduced; store means for storing a plurality of image enlarging/reducing manners of processing digital original image data representative of an original image which are inputtable by the input means to thereby enlarge or reduce the original image with a value of magnification/reduction ratio inputtable by the input means, the plurality of image enlarging/reduction manners respectively corresponding to a plurality of data of information on at least one of the magnification/reduction ratio and the original image;

selection means for selecting one of the plurality of image enlarging/reducing manners in accordance with data of information on at least one of the desired magnification/reduction ratio value and the actual original image; and image enlarging/reducing means for subjecting the actual digital original image data to the selected one of the plurality of image enlarging/reducing manners to thereby enlarge or reduce the actual original image with the desired magnification/reduction ratio value.

The selection means may include: judge means for judging which one of the plurality of data of information on at least one of the magnification/reduction ratio and the original image corresponding to the plurality of image enlarging/reducing manners is consistent with the data of information on at least one of the desired magnification/reduction ratio value and the actual original image; and manner selection means for selecting one of the plurality of image enlarging/reducing manners corresponding to the data of information on at least one of the magnification/reduction ratio and the original image consistent with the data of information on at least one of the desired magnification/reduction ratio value and the actual original image.

The plurality of image enlarging/reducing manners may include at least a first image enlarging/reducing manner of enlarging or reducing the original image and a second image enlarging/reducing manner of enlarging or reducing the original image which is more complicated relative to the first image enlarging/reducing manner to thereby more elaborately enlarge or reduce the original image in comparison with the first image enlarging/reducing manner.

In this case, the judge means may include comparison means for comparing the value of desired magnification/reduction ratio with a reference value, and the manner selection means selects the first image enlarging/reducing unit where the value of desired magnification/reduction ratio is lower than the reference value and selects the second image enlarging/reducing unit where the value of desired magnification/reduction ratio is equal to or higher than the reference value.

In the case where the information on the original image includes an amount of the digital original image data of the original image, the judge means may include comparison means for comparing an amount of the actual digital original image data with a reference amount, and the manner selection means selects the first image enlarging/reducing unit where the amount of the actual original image data is higher than the reference amount and selects the second image enlarging/reducing unit where the amount of the actual original image data is equal to or lower than the reference amount.

In the case where the information on the original image includes a kind of the original image determined dependently on definition of an outline presented in the original image, the judge means judges whether the kind of the actual original image corresponds to a natural image which has an outline having low definition and an illustration image which has an outline having high definition, and the manner selection means selects the first image enlarging/reducing manner where the kind of the actual original image is judged to be the illustration image and selects the second image enlarging/reducing manner where the kind of the actual original image is judged to be the natural image.

According to another aspect, the present invention provides a digital image processing device for enlarging or reducing an original image, based on digital original image data representative of the original image, the digital original image data including density data representative of density values of a multiplicity of picture elements of the original image which are arranged in rows and columns that are perpendicular to each other. The digital image processing device comprises: input means for receiving digital original image data representative of an original image and a value of desired magnification/reduction ratio with which the original image is to be enlarged or reduced; a plurality of image enlarging/reducing units for processing the digital original image data in manners different from one another, to thereby enlarge or reduce the original image with the desired magnification/reduction ratio value; and selection means for selecting one of the plurality of image enlarging/reducing units in accordance with at least one of the desired magnification/reduction ratio value and information on the original image to thereby allow the selected one of the plurality of image enlarging/reducing units to process the digital original image data in the corresponding manner to thereby enlarge or reduce the original image with the desired magnification/reduction ratio value.

The plurality of image enlarging/reducing units may include at least a first image enlarging/reducing unit for processing the digital original image data in a first image enlarging/reducing manner and a second image enlarging/reducing unit for processing the digital original image data in a second image enlarging/reducing manner, the first image enlarging/reducing manner being simpler than the second image enlarging/reducing manner to thereby more roughly enlarge or reduce the original image in a shorter period of time in comparison with the second image enlarging/reducing manner. In this case, the selection means may include: comparison means for comparing the value of desired magnification/reduction ratio with a reference value; and unit selection means for selecting the first image enlarging/reducing unit where the value of desired magnification/reduction ratio is lower than the reference value and for selecting the second image enlarging/reducing unit where the value of desired magnification/reduction ratio is equal to or higher than the reference value.

In the case where the information on the original image may include an amount of the digital original image data, the selection means may include: comparison means for comparing the amount of the digital original image data with a reference amount; and unit selection means for selecting the first image enlarging/reducing unit where the amount of the original image data is higher than the reference amount and for selecting the second image enlarging/reducing unit where the amount of the original image data is equal to or lower than the reference amount.

In the case where the information on the original image includes the number of colors distributed in an area sampled from the original image, the selection means may include: color number comparing means for comparing the number of colors distributed in the area sampled from the original image with a reference number; and unit selection means for selecting the first image enlarging/reducing unit where the number of colors is equal to or lower than the reference number and for selecting the second image enlarging/reducing unit where the number of colors is higher than the reference number.

According to further aspect, the present invention provides an image forming system for receiving an original image, enlarging or reducing the original image and outputting the enlarged or reduced original image, the image forming system comprising: input means for receiving digital original image data representative of an original image and a value of desired magnification/reduction ratio with which the original image is to be enlarged or reduced; a plurality of image enlarging/reducing units for processing the digital original image data in manners different from one another, to thereby enlarge or reduce the original image with the desired magnification/reduction ratio value; and selection means for selecting one of the plurality of image enlarging/reducing units in accordance with information on at least one of the original image and the desired magnification/reduction ratio value to thereby allow the selected one of the plurality of image enlarging/reducing units to process the digital original image data in the corresponding manner to thereby enlarge or reduce the original image with the desired magnification/reduction ratio value and output an enlarged or reduced original image.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENTS

Figure 1:
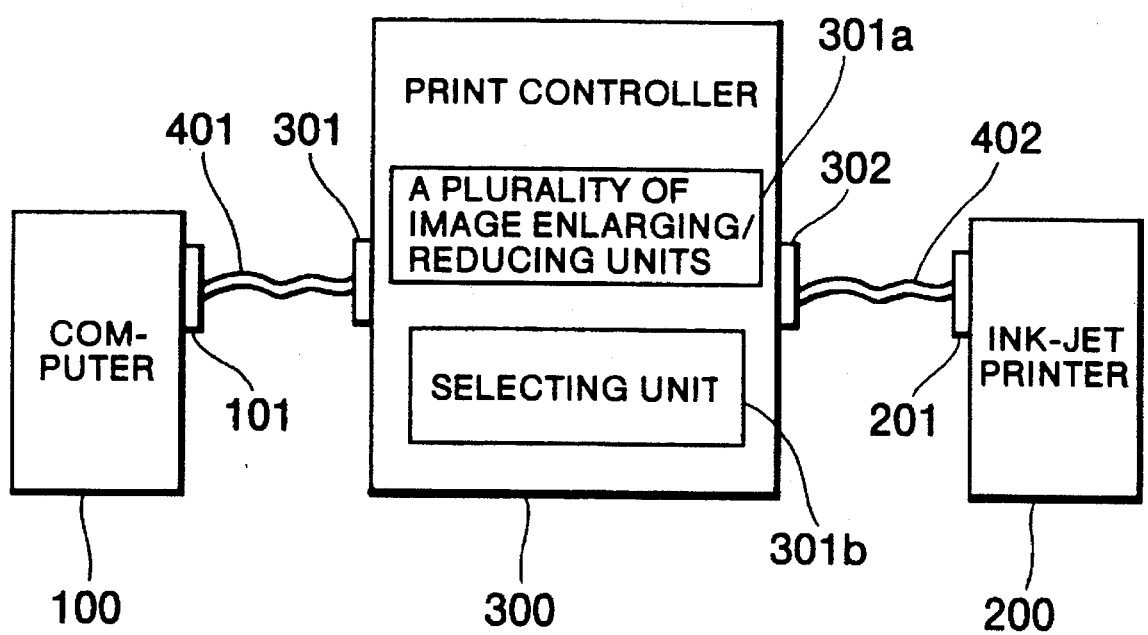
FIG. 1 is a diagrammatical view showing the external connection between a print control apparatus and related equipment, the print control apparatus being an example of a digital image processing device of the present invention according to first through third embodiments.

A digital image processing device of the present invention serves to receive digital original image data representative of an original image and magnification/reduction ratio data representative of a desired magnification/reduction ratio value with which the original image is to be enlarged or reduced. The digital image processing device processes the digital original image data to enlarge or reduce the original image with the desired magnification/reduction ratio value. The digital original image data include density data representative of the density of each of a multiplicity of picture elements which are arranged in a matrix consisting of a plurality of rows and a plurality of columns which extend perpendicularly to the rows. When the original image is a full-color image, a color at each picture element is determined by three sets of density data corresponding to three primary colors for that picture element. The digital image processing device is provided with a plurality of image enlarging/reducing manners and a selecting unit. Each of the plural image enlarging/reducing manners is adapted to process the digital original image data in a corresponding manner to enlarge or reduce the original image to produce an output image. The plural image enlarging/reducing manners include at least a first image enlarging/reducing manner which operates to subject the digital original image data to a relatively simple calculation operation to thereby roughly enlarge or reduce the original image and a second image enlarging/reducing manner which operates to subject the digital original image data to a relatively complicated calculation operation to thereby elaborately enlarge or reduce the original image. The selecting unit is adapted to select one of the plurality of image enlarging/reducing manners in accordance with information on at least one of the original image and the magnification/reduction degree by which the original image is to be enlarged or reduced and to allow the selected one image enlarging/reducing manner to perform its own image enlarging/reducing operation. In the case where the information on at least one of the original image and the magnification/reduction degree indicates that the period of time required for enlarging or reducing the original image may become not so long, the selecting unit selects the second image enlarging/reducing manner to allow the second image enlarging/reducing manner to elaborately enlarge or reduce the original image to produce the output image. In the case where the information indicates that the period of time required for enlarging or reducing the original image may become long, on the other hand, the selecting unit selects the first image enlarging/reducing manner to allow the first image enlarging/reducing manner to roughly enlarge or reduce the original image. The output image thus produced by the selected image enlarging/reducing manner is outputted from the digital image processing device.

Thus, according to the digital image processing device of the present invention, the digital original image data are subjected to such an image enlarging/reducing processing as corresponds to the information on at least one of the original image and the magnification/reduction degree. More specifically, the digital original image data are subjected to an image enlarging/reducing processing which is suited to minimize the period of time for the image enlarging/reducing processing without deteriorating the original image in its quality. Accordingly, the digital image processing device can enlarge or reduce any original image by any desired magnification/reduction degree in a short period of time and produce an output image of good quality.

A first preferred embodiment of the present invention will be described hereinafter.

A digital image processing device of the first embodiment is provided with the plurality of image enlarging/reducing manners and a magnification/reduction ratio-based selecting unit. The magnification/reduction ratio-based selecting unit is adapted to select one of the plurality of image enlarging/reducing manners in accordance with the data representative of the desired magnification/reduction ratio value and allow the selected one image enlarging/reducing manner to perform its own image enlarging/reducing operation. Here, the magnification/reduction ratio can be represented by a percentage [%]. A value of the magnification/reduction ratio lower than 100 [%] therefore represents a reduction ratio with which the original image is to be reduced, and a value of the magnification/reduction ratio higher than 100 [%] represents a magnification with which the original image is to be enlarged. As apparent from the above, the higher the magnification/reduction ratio, the larger the output image to be obtained from the original image.

In the present embodiment, in the case where the desired magnification/reduction ratio has a high value, the selecting unit selects the second image enlarging/reducing manner to allow the second image enlarging/reducing manner to elaborately enlarge or reduce the original image by the desired magnification/reduction ratio to produce the output image. In the case where the desired magnification/reduction ratio has a low value, on the other hand, the selecting unit selects the first image enlarging/reducing manner to allow the first image enlarging/reducing manner to roughly enlarge or reduce the original image by the desired magnification/reduction ratio. The output image thus obtained by the selected image enlarging/reducing manner is outputted from the digital image processing device.

For example, in the case where it is desired to enlarge the original image with a high value of magnification, the selecting unit may select the second image enlarging/reducing manner to allow the second image enlarging/reducing manner to elaborately enlarge or reduce the original image by the desired high magnification to produce the output image. In the case where it is desired to enlarge the original image with a low value of magnification or it is desired to reduce the original image with a desired reduction ratio, the selecting unit may select the first image enlarging/reducing manner to allow the first image enlarging/reducing manner to roughly enlarge or reduce the original image by the desired magnification/reduction ratio.

Thus, according to the digital image processing device of the present embodiment, the digital original image data are subjected to such an image enlarging/reducing processing as corresponds to the magnification/reduction ratio value with which the image enlarging/reducing processing is to be performed. More specifically, the digital original image data are subjected to an image enlarging/reducing processing which is suited to minimize the period of time in which the processing is completed without deteriorating the original image in its quality. Accordingly, the digital image processing device can enlarge or reduce the original image by any desired magnification/reduction degree in a short period of time and produce an output image of good quality.

An illustrative example of the digital image processing device of the present embodiment will be described hereinafter, with reference to the accompanying drawings of FIGS. 1 through 8.

FIG. 1 diagrammatically illustrates external connections of the print control apparatus according to the present invention. As shown in FIG. 1, an external connector 101 of an external host computer 100 is connected to a first interface connector 301 of a print controller 300 of the present invention via a first cable 401 so that the computer 100 and the print controller 300 can exchange therebetween command signals and digital original image data for all the rasters of a print output of one page (an original image to be enlarged or reduced). The digital original image data for each raster of the original image will be referred to as "raster image data", hereinafter. Similarly, a second interface connector 302 of the print controller 300 is connected to an interface connector 201 of an ink-jet printer 200 via a second cable 402 so that raster image data which have been subjected to the image enlarging/reducing operation in the print controller 300 are successively supplied therefrom to the ink-jet printer 200. The image printing control device 300 includes a plurality of image enlarging/reducing manners 301a and a selecting unit 301b which will be described later.

The construction of the print controller 300 will be described in greater detail with reference to FIG. 2.

Figure 2:
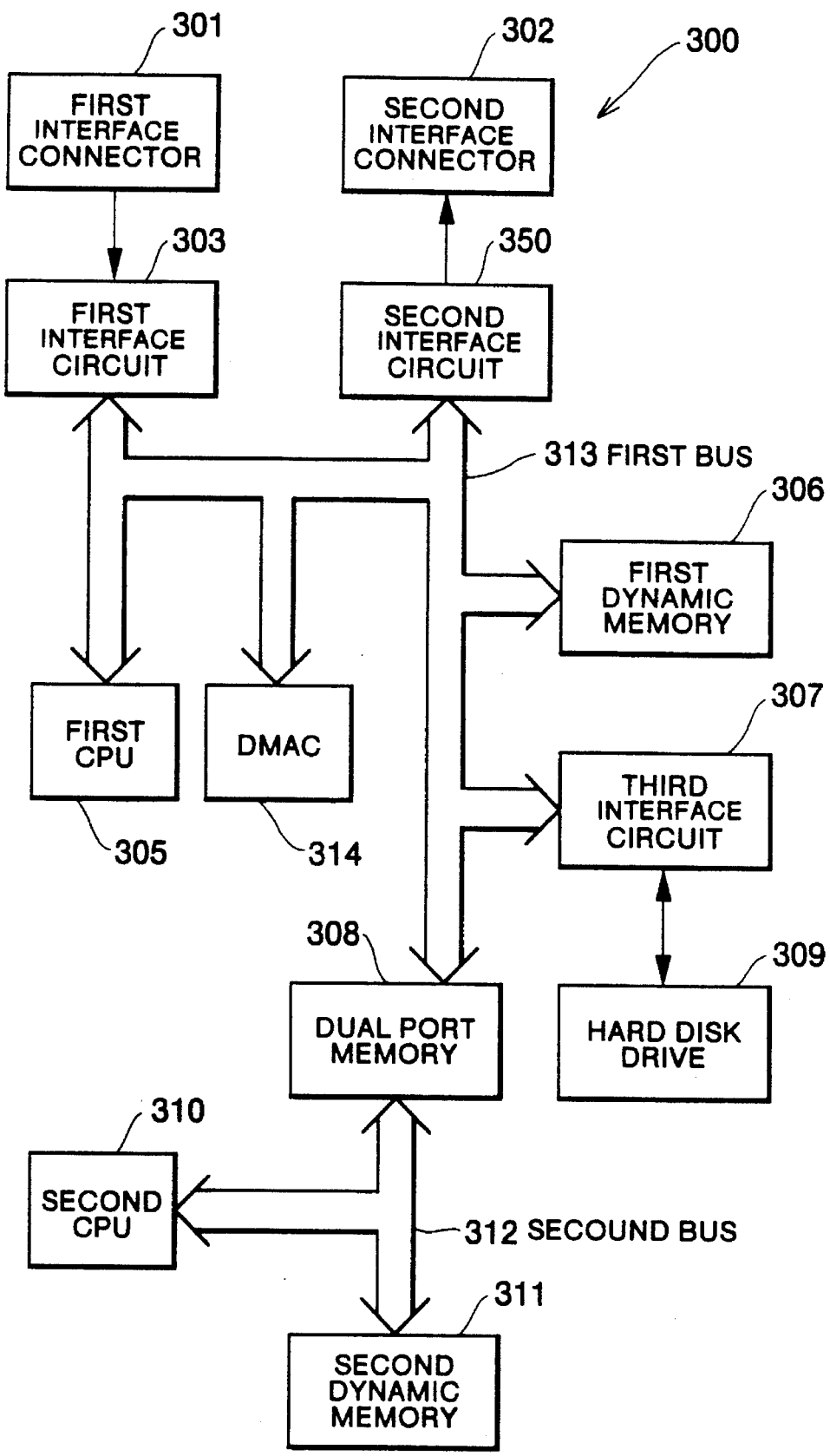
FIG. 2 is a block diagram of the digital image processing device shown in FIG. 1.

As shown in FIG. 2, the first interface connector 301 of the print controller 300 is connected to a first interface circuit 303 so that the command signals and the raster image data supplied from the computer 100 (FIG. 1) to the first interface connector 301 are received by the first interface circuit 303. Similarly, the second interface connector 302 of the print controller 300 is connected to a second interface circuit 350 to enable the latter to transmit the command signals and the raster image data through the second interface connector 302 to the ink-jet printer 200 (FIG. 1). The first and second interface circuits 303, 350 are connected at their opposite ends to a first bus 313 for permitting exchange of signals and data between these interface circuits 303, 350 and a first central processing unit (CPU) 305. The first bus 313 is also connected to a first dynamic memory 306 for storing data therein, a third interface circuit 307 undertaking interface with an external storage unit such as a hard disk drive 309, a first port of a dual port memory 308 which has two ports and permits access from both ports to the same memory cell for communication between a second CPU 310 described later, and a direct memory access controller (DMAC) 314 for achieving a direct memory transfer between related devices.

The hard memory disk drive 309 stores therein a plurality of programs PM for a plurality of image enlarging/reducing manners M and a single program PS for selecting one of the plurality of image enlarging/reducing manners M. The selecting program PS defines therein a reference value N which will be described later. In this example, the hard memory disk drive 309 stores therein a program PM0 for an image enlarging/reducing manner M0, a program PM1 for another image enlarging/reducing manner M1 and a program PM2 for a further image enlarging/reducing manner M2. The program PS is defined for selecting one of the three image enlarging/reducing manners M0, M1 and M2. Since the programs PM are thus stored in the hard memory disk drive 309, it is easily possible to additionally store other new programs PM4, PM5, etc. for new image enlarging/reducing manners M4, M5, etc. in the hard memory disk drive 309 or replace the programs PM0, PM1, etc. with the new programs PM4, PM5, etc.

The second CPU 310 has a second bus 312 to which are connected a second port of the dual port memory 308, and a second dynamic memory 311 for storing data therein. In FIG. 2, various control signals including an address bus signal, a chip select signal and the like are not shown.

Figure 3:
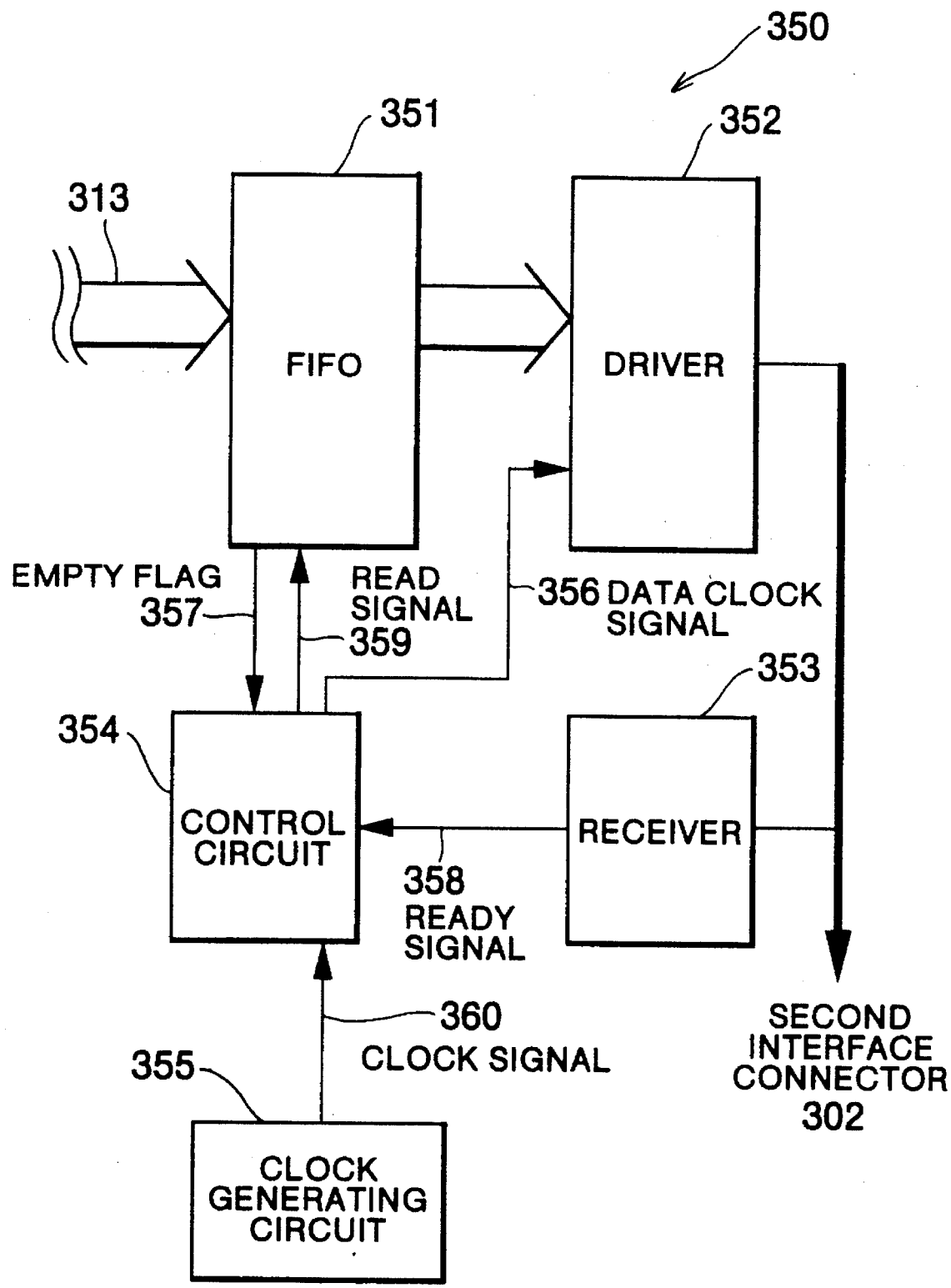
FIG. 3 is a block diagram showing an interface circuit shown in FIG. 2.

Referring now to FIG. 3, there is shown the structural details of the second interface circuit 350 in the print controller 300.

As shown in FIG. 3, a data input end of a first-in-first-out memory (hereinafter referred to as "FIFO") 351 is connected to the first bus 313 so that data from the first CPU 305 can be written to the FIFO 351. The data output end of the FIFO 351 is connected to a driver 352 which outputs data to the second interface connector 302. A receiver 353 is provided in order to receive a ready signal supplied from the ink-jet printer 200 via the second interface connector 302 and input these signals to a control circuit 354 as indicated by an arrow 358. The control circuit 354 generates a read signal 359 which is supplied to the FIFO 351, and a data clock signal 356 which is outputted via the driver 352 to the second inter-face connector 302. Timing of the operation of the control circuit 354 is controlled by a clock signal 360 generated by a clock generation circuit 355. An empty flag 357 of the FIFO 351 is inputted to the control circuit 354.

The construction of the ink-jet printer 200 will be described in greater detail with reference to FIG. 4.

Figure 4:
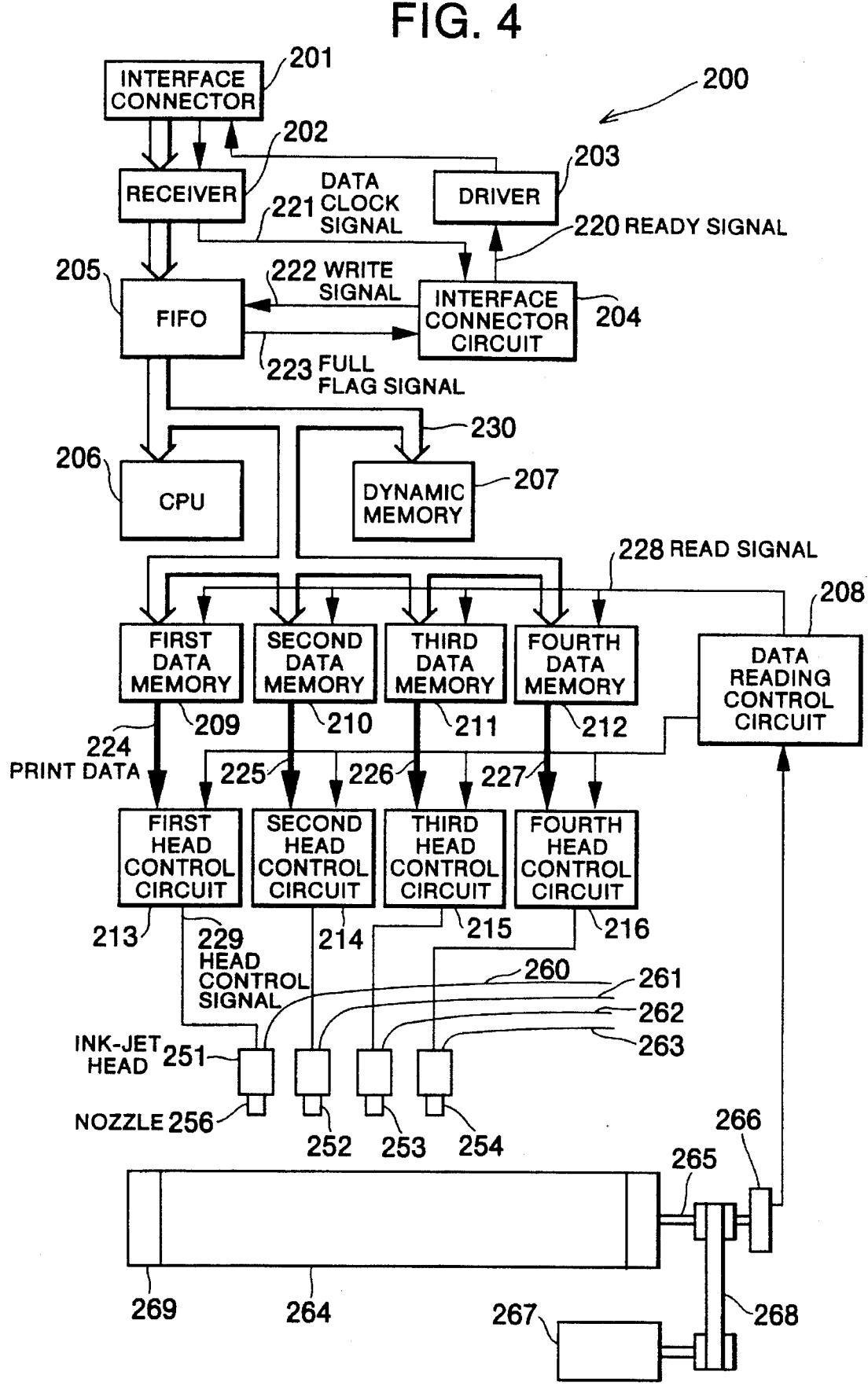
FIG. 4 is a block diagram showing the internal structure of an ink-jet printer of FIG. 1.

As shown in FIG. 4, the interface connector 201 is connected to a receiver 202. The receiver 202 inputs input data and a data clock signal 221 respectively to a data input end of an FIFO 205 and an interface control circuit 204. The interface connector 201 is also connected to a driver 203 so that a ready signal 220 generated by the interface control circuit 204 is outputted from the driver 203 to the interface connector 201. In order to prevent the FIFO 205 from over-flowing, a full flag signal 223 of the FIFO 205 is supplied to the interface control circuit 204. A write signal 222 is supplied from the interface control circuit 204 to the FIFO 205 to write data to the FIFO 205.

The data output end of the FIFO 205 is connected to a bus 230 so that the CPU 206 can read data from the FIFO 205. The bus 230 is also connected to a dynamic memory 207 and to first, second, third and fourth memories 209, 210, 211 and 212. The dynamic memory 207 is used for storing data, while the first, second, third and fourth memories 209, 210, 211 and 212 are used to store the raster image data described later. With the bus 230 thus connected, it is possible to exchange data between the interconnected devices. A data output end of the first data memory 209 is connected to a first head control circuit 213 for delivering the raster image data 224 to the first head control circuit 213. A read signal 228 is supplied from a data readout control circuit 208 to the first data memory 209 for controlling the data reading process. The first head control circuit 213 produces a head control signal 229 based on the raster image data and supplies it to a first ink-jet head 251 for controlling an amount of ink ejected from a nozzle 256 of the first ink-jet head 251. The first ink-jet head 251 is connected to a first pipe 260 through which an ink is supplied from an ink pump (not shown) to the first ink-jet head 251. The second, third and fourth data memories 210, 211 and 212 are connected to the related parts in the same manner as the first data memory 209 described above and, hence, a further description will be omitted. The first, second, third and fourth ink-jet heads 251, 252, 253 and 254, respectively, are supplied with inks of four different colors such as black, yellow, magenta and cyan that are fed through the corresponding pipes 260, 261, 262 and 263.

The four ink-jet heads 251-254 are disposed in confrontation with a drum 269 on which a paper sheet 264 is wound. The drum 269 is rotatable about a shaft 265, and an encoder 266 is connected to the shaft 265 for sending a timing signal to the data readout control circuit 208. The shaft 265 is connected by an endless belt 268 to a motor 267 so that a rotary motion of the motor 267 is transmitted via the belt 268 to the shaft 265. The four ink-jet heads 251-254 are disposed on a single bed (not shown) and movable as a single unit in a direction parallel to a longitudinal axis of the drum 269.

A sequence of operations of the print controller 300 will be described with reference to FIGS. 1 through 8.

When the first CPU 305 (FIG. 2) receives from the computer 100 the command signals and the raster image data for all the rasters of one page of print output (digital original image data for an original image), it first places the command signals and the raster image data into the hard disk drive 309. In this instance, since the controller 300 receives the command signals and the raster image data without interpretation, the computer 100 is relieved from a communication task earlier than conventional. In addition, since the command signals and the raster image data are stored in the hard disk drive 309, it is possible to reduce the capacity of the first dynamic memory 306.

When the command signals and the raster image data from the computer 100 (FIG. 1) are entirely inputted, the first CPU 305 writes to the dual port memory 308 a command or instruction that instructs the second CPU 310 to interpret or develop the command signals.

Upon receipt of the instruction, the second CPU 310 writes to the dual port memory 308 a command or instruction that instructs the first CPU 305 to read the command signals from the hard disk drive 309 and write them to the dual port memory 308. Thereafter, the command signals read or retrieved from the hard disk drive 309 are written to the dual port memory 308 whereupon the second CPU 310 retrieves the command signals from the dual port memory 308 and interprets the command signals so as to perform the image enlarging/reducing operation of the present invention.

The image enlarging/reducing process will be described hereinafter, with reference to FIGS. 5 and 6.

The second CPU 310 first reads out the command signals which are now stored in the dual port memory 308, in a step S1. In the case where the command signals include a command that instructs that the image enlarging/reducing operation should be performed, the CPU 310 determines to perform its image enlarging/reducing operation. Since the command for executing the image enlarging/reducing operation includes data representative of a value of magnification/reduction ratio R [%], the CPU 310 reads out the magnification/reduction ratio data from the memory 308.

Then, the second CPU 310 inputs in the dual port memory 308 a command that instructs the first CPU 305 to read out the selecting program PS from the hard memory disk drive 309 in step S2. The first CPU 305 reads out the command from the dual port memory 308, and reads out the selecting program PS from the hard disk memory drive 309 and inputs the program PS to the dual port memory 308 in step S3. The second CPU 310 then reads out the selecting program PS from the dual port memory 308 and inputs it to the second dynamic memory 311 in step S4. Since the data representative of the reference value N is defined in the selecting program PS, the data of the reference value N is also inputted to the second dynamic memory 311.

Then, the second CPU 310 executes the image enlarging/reducing operation selecting program PS which is now stored in the second dynamic memory 311, in step S5, while referring to the reference value N which is also stored in the dynamic memory 311 and the magnification/reduction ratio R in step S5. In other words, the second CPU 310 selects one of the programs PM for the plural image enlarging/reducing manners M through comparing the magnification/reduction ratio value R relative to the reference value N.

Next, in step S6, the second CPU 310 inputs into the dual port memory 308 a command that instructs the first CPU 305 to read out from the hard memory disk drive 309 the program PM for the image enlarging/reducing manner M which has been selected in the step S5. The first CPU 305 reads out the command from the dual port memory 308, and reads out the selected image enlarging/reducing program PM from the hard memory disk drive 309 and inputs the program PM into the dual port memory 308 in step S7. The second CPU 310 reads out the selected image enlarging/reducing program PM from the dual port memory 308 and inputs it into the second dynamic memory 311 in step S8.

Figure 6:
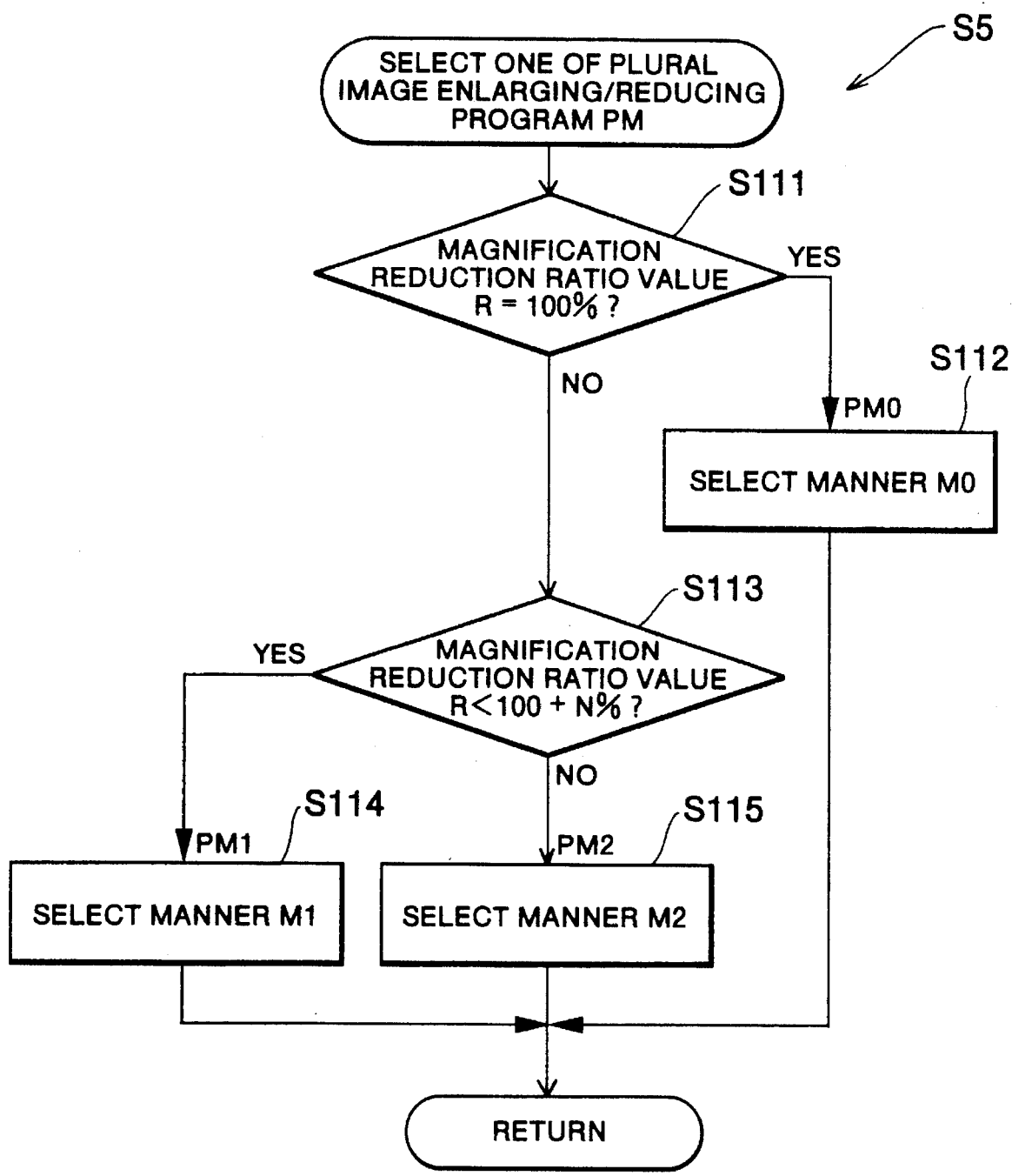
FIG. 6 illustrates the sequence of the image enlarging/reducing operation selecting process according to the first embodiment.

Referring to FIG. 6, the image enlarging/reducing operation selecting step S5 will be described in greater detail, hereinafter.

In the case where the magnification/reduction ratio value R [%] is judged to be equal to 100% in step S111, it is unnecessary to subject the digital original image data to any image enlarging/reducing operation. In other words, an output image to be formed by the printing control device should be completely the same as the original image. Accordingly, in step S112, the image enlarging/reducing manner M0 is selected. The image enlarging/reducing manner M0 will convert the digital original image data into digital output image data representative of the output image which are completely equal to the digital original image data.

In the case where the magnification/reduction ratio value R [%] is judged to be not equal to 100% in step S111, on the other hand, the second CPU 310 refers to the reference value N which is now stored in the second dynamic memory 311 in step S113. In other words, the second CPU 310 further judges whether or not the magnification/reduction ratio value R [%] is lower than the value of (100+N) %. In the case where the magnification/reduction ratio value R is lower than the value of (100+N) %, it can be determined that the quality of the original image may not be deteriorated even through a rough image enlarging/reducing manner. Accordingly, the CPU 310 selects the image enlarging/reducing manner M1 in step S114. The image enlarging/reducing manner M1 will convert the digital original image data into digital output image data through a relatively simple calculation operation. In this example, the image enlarging/reducing manner M1 employs a linear interpolation method in which the density values for the new picture elements to be inserted in the original image are determined through a linear interpolation method.

On the other hand, in the case where the magnification/reduction ratio value R [%] is equal to or higher than the value of (100+N) %, it can be determined that the quality of the original image may be deteriorated through the rough image enlarging/reducing manner and therefore that it is necessary to elaborately enlarge or reduce the original image. Accordingly, the CPU 310 selects the image enlarging/reducing manner M2 in step S115. The image enlarging/reducing manner M2 will convert the digital original image data into digital output image data through a relatively complicated calculation operation. In this example, the image enlarging/reducing manner M2 employs a method in which the density values for the new picture elements to be inserted in the original image are determined through an interpolation method of spline curved surface of third order.

It is noted that the reference value N may be freely selected. The value N may be selected to any suitable value. The value N may be selected to zero (0), a positive value or a negative value. For example, in the case where the reference value N is set to be zero (0), if it is desired to enlarge the original image (R>100[%]), the original image will be enlarged through the complicated manner M2. If it is desired to reduce the original image (R<100[%]), the original image will be reduced through the simple manner M1. As another example, in the case where the reference value N is set to be 1000 [%], if it is desired to enlarge the original image by a magnification value of lower than 1000 [%] or it is desired to reduce the original image (R<1000 [%]), the original image will be enlarged or reduced through the simple manner M1. If it is desired to enlarge the original image by a magnification value of equal to or higher than 1000 [%](R>1000 [%]), the Original image will be enlarged through the complicated manner M2.

Figure 7:
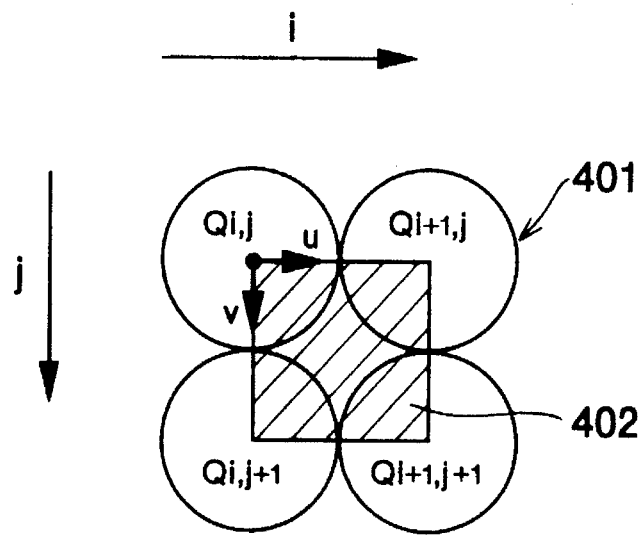
FIG. 7 is a diagrammatical view illustrative of an example of the image enlarging/reducing operation M1 employing linear interpolation method of the present invention.

An example of the image enlarging/reducing manner M1 which employs a linear interpolation method will be described in great detail with reference to FIG. 7, hereinafter.

Now assume that four pixels given by coordinates of (Qi,j), (Qi+1,j), (Qi,j+1), and (Qi+1,j+1) of the original image which are arranged in vertical and horizontal juxtaposition are defined as control points 401. A square plane (Pi,j) 401 indicated by hatching is therefore given by the following expression (1).

$$Pi,j(u,v)=uN_L Q N_L^T v^T$$

where $u=[u\ 1]$, $$N_L = \begin{bmatrix} -1 & 1 \\ 1 & 0 \end{bmatrix},$$

$$Q = \begin{bmatrix} Qi,j & Qi,j+1 \\ Qi+1,j & Qi+1,j+1 \end{bmatrix}$$

Since the coefficient matrix $N_L$ consists of only 0, 1 and −1, calculation (1) of the Pi,j cannot load the CPU severely. Substituting any real number for u and v where 0<u<1 and 0<v<1, we have a different number of pixels on the plane (Pi,j) 401. For instance, a 7-times enlargement of the original image in vertical and horizontal directions is desired, the u, v values are substituted by 0.0, 0.143, 0.286, 0.429, 0.571, 0.714 and 0.857. Then, calculating from the above-specified expression (1), we have a total of 49 sets of pixel coordinates. Performing the foregoing processing for all the picture elements in the original image, it is possible to obtain a 7-times enlarged image.

In order to reduce the original image with a desired reduction ratio, on the other hand, the planes Pi,j defined for all the picture elements on the original image are selectively subjected to the interpolation process represented by the above-described equation (1). Accordingly, in order to reduce the original image with a desired reduction ratio through the linear interpolation method, the following operation should be achieved.

First, a variable RT and the values i and j are initialized to be 0. (The variable RT is a sum of reciprocals of reduction ratio, as apparent from the following description). Before calculating the plane Pi,j through the equation (1), judgement of the value of the variable RT is performed. In the case where the variable RT is equal to or larger than 1, it is judged that no new picture element should be produced on the plane Pi,j, and therefore the calculation of the equation (1) is not performed, but a value of 1 is subtracted from the variable RT. In the case where the variable RT is smaller than 1, it is judged that a new picture element should be produced on the plane Pi,j, and therefore the calculation of the equation (1) is performed with substituting the value RT for each of the values u and v. Thus, a new picture element is obtained at the plane Pi,j. Then, the variable RT is changed to have a value of a sum of the value of RT and a value obtained by subtracting 1 from a reciprocal of the reduction ratio. The above operation is performed while incrementing the values of i and j, so that the above process is repeatedly attained for an entire area of the original image. As a result, the original image is reduced with the desired reduction ratio.

For example, in order to reduce the original image horizontally and vertically with a reduction ratio of 67 [%] (=2/3), the variable RT and the values of i and j are first initialized to 0. In this instance where i=0, since the variable RT is equal to 0 which is lower than 1, calculation of the equation (1) is attained with substituting 0 to each of the values of u and v, so that a new pixel value is obtained. Then, the variable RT is renewed into a value of 0.5=0+(1.5−1), and the value of i is incremented by 1. In this instance where i=1, since the variable RT is now equal to 0.5 which is lower than 1, calculation of the equation (1) is achieved with substituting 0.5 to each of the values of u and v, so that a new pixel value is obtained. Then, the variable RT is further renewed into a value of 1=0.5+(1.5−1), and the value of i is incremented by 1. In this instance where i=2, since the variable RT is now equal to 1 which is equal to 1, calculation of the equation (1) is not achieved, and therefore no new picture element is obtained. Then, 1 is subtracted from the variable RT, so that the variable RT is renewed into 0. The value of i is further incremented by 1. In this instance where i=3, since the variable RT is now equal to 0 which is lower than 1, calculation of the equation (1) is achieved with substituting 0 to each of the values of u and v, so that a new pixel value is obtained. Then, the variable RT is further renewed into a value of 0.5=0+(1.5−1), and the value of i is incremented by 1. The above processings are repeatedly achieved for the cases where the value i has values of 4, 5, . . . The above-described processings are similarly achieved for the value j, so that the above processings are performed for an entire area of the original image. As a result, the original image is reduced with the reduction ratio of 67 [%].

Figure 8:
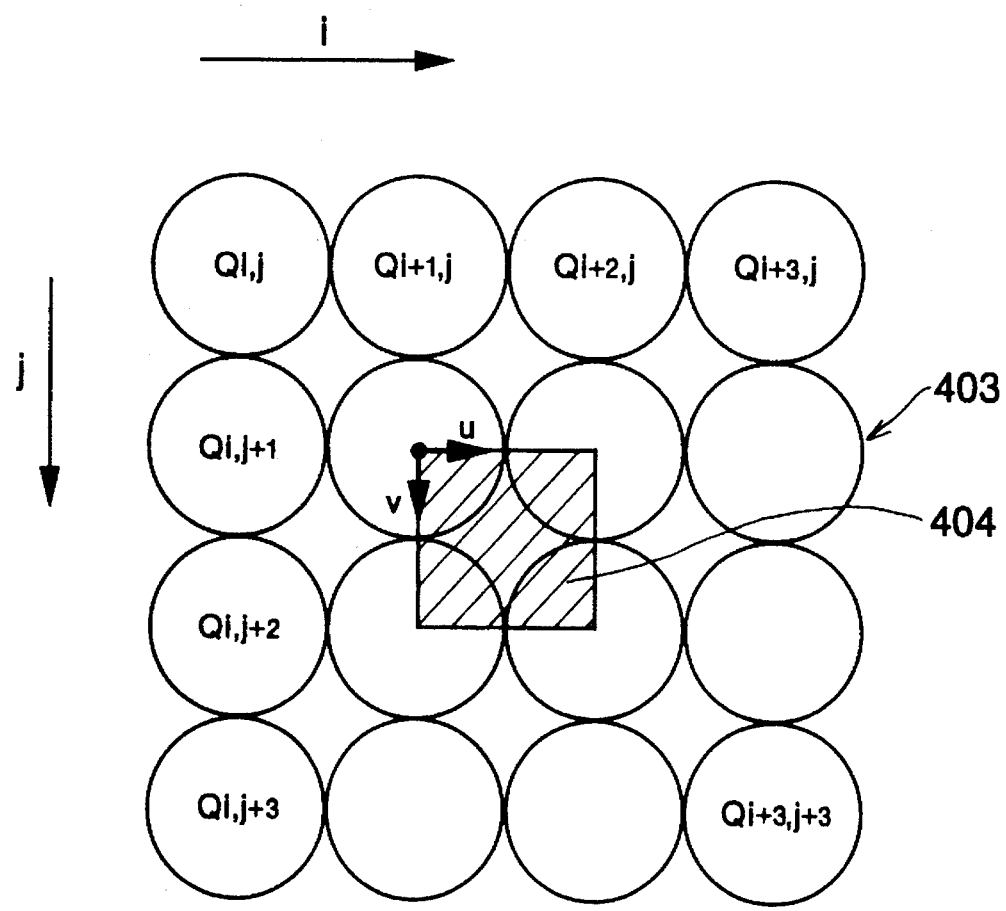
FIG. 8 is a diagrammatical view illustrative of an example of the image enlarging/reducing operation M2 employing interpolation method of spline curved surface of third order of the present invention.

An example of the image enlarging/reducing manner M2 which employs the interpolation method of spline curved surface of third order will be described in great detail with reference to FIG. 8, hereinafter.

Now assume that sixteen pixels given by coordinates of (Qi,j), (Qi+1,j), (Qi+2,j), (Qi+3,j), (Qi,j+1), (Qi+1,j+1), (Qi+2,j+1), (Qi+3,j+1), (Qi,j+2), (Qi+1,j+2), (Qi+2,j+2), (Qi+3,j+2), (Qi,j+3), (Qi+1,j+3), (Qi+2,j+3), and (Qi+3,j+3) of the original image which are arranged in vertical and horizontal juxtaposition are defined as control points 403. A square plane (P'i,j) 404 indicated by hatching is therefore given by the following expression (2).

$$P'i,j(u,v) = u N_R Q N_R^T v^T$$

where $u=[u^3\ u^2\ u\ 1]$ $v=[v^3\ v^2\ u\ 1]$ $$N_R = \begin{bmatrix} -1/6 & 1/2 & -1/2 & 1/6 \\ 1/2 & -1 & 1/2 & 0 \\ -1/2 & 0 & 1/2 & 0 \\ 1/6 & 2/3 & 1/6 & 0 \end{bmatrix}$$

$$Q = \begin{bmatrix} Qi,j & Qi,j+1 & Qi,j+2 & Qi,j+3 \\ Qi+1,j & Qi+1,j+1 & Qi+1,j+2 & Qi+1,j+3 \\ Qi+2,j & Qi+2,j+1 & Qi+2,j+2 & Qi+2,j+3 \\ Qi+3,j & Qi+3,j+1 & Qi+3,j+2 & Qi+3,j+3 \end{bmatrix}$$

since the coefficient matrix $N_R$ consists of a large number of real numbers, the period of time required for calculating the P'i,j is longer than that required for calculating the above-described Pi,j through the linear interpolation method, but the calculation of the P'i,j enables more elaborate interpolation. Substituting any real number for u and v where 0<u<1 and 0<v<1, we have a different number of pixels on the plane (P'i,j) 404. For instance, a 8-times enlargement of the original image in vertical and horizontal directions is desired, the u, v values are substituted by 0.0, 0.125, 0.250, 0.375, 0.50, 0.625, 0.750 and 0.875. Then, calculating from the above-specified expression (2), we have a total of 64 sets of pixel coordinates. Performing the foregoing processing for all the picture elements in the original image, it is possible to obtain a 8-times enlarged image.

In order to reduce the original image with a desired reduction ratio, on the other hand, the planes Pi,j for all the picture elements on the original image are selectively subjected to the interpolation process represented by the above-described equation (2), similarly in the linear interpolation method described already. Accordingly, in order to reduce the original image with a desired reduction ratio through the interpolation method employing the spline curved surface of third order represented by the above equation (2), the planes P'i,j for an entire area of the original image are selectively subjected to the equation (2), in the same manner as described for the linear interpolation method.

Figure 5:
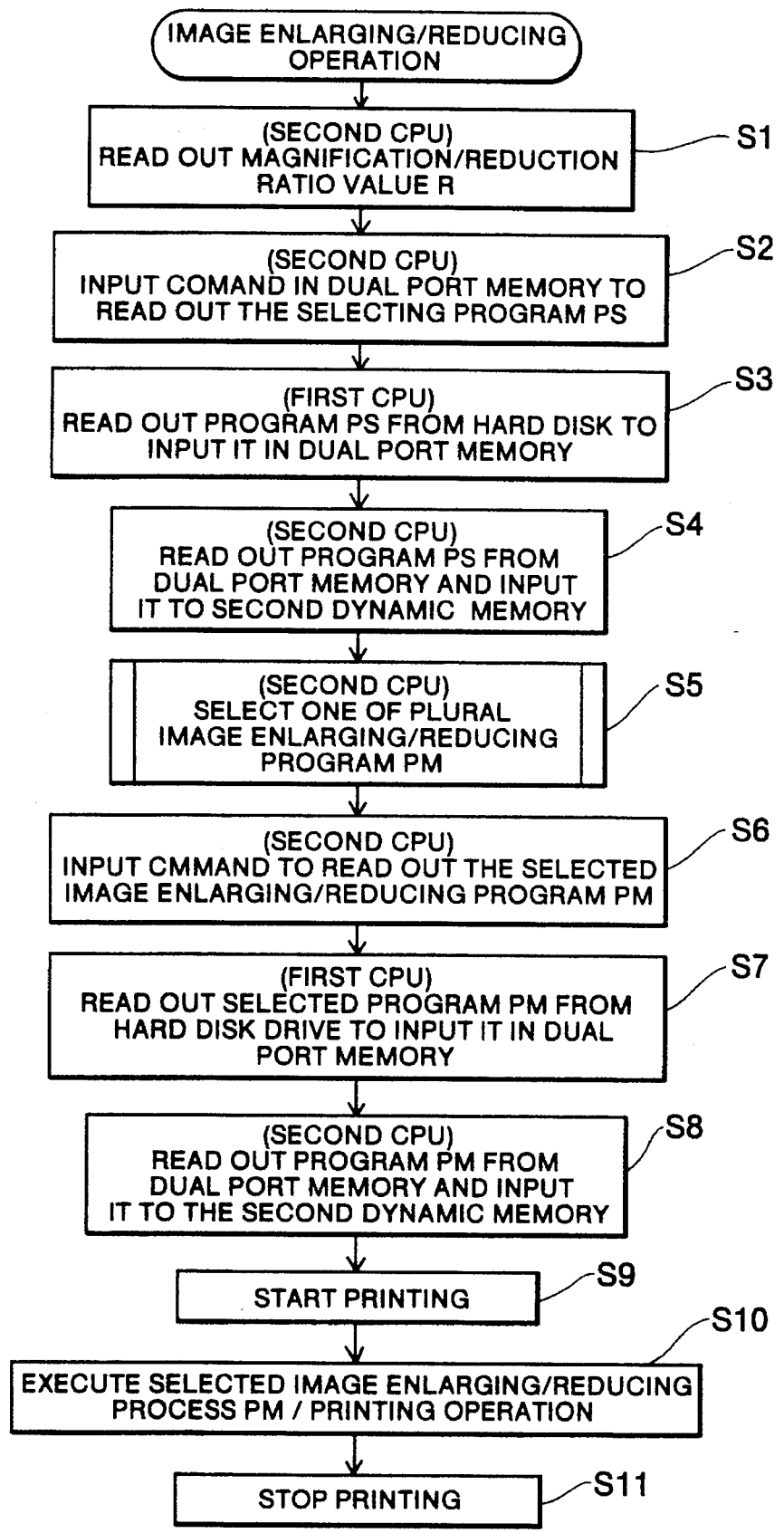
FIG. 5 illustrates the sequence of the image enlarging/reducing operation according to the first embodiment.

When the above-described processings (steps S1 through S8) have been completed, as shown in FIG. 5, the printing control apparatus 300 is ready for the image enlarging/reducing operation. In step S9, then, the second CPU 310 gives a command or instruction to the dual port memory 308, notifying that printing is to be started. The first CPU 305, upon receipt of the instruction, writes signals to the FIFO 351 of the second interface control circuit 350, the signals forming a start command of the ink-jet printer 200. When the ready signal is generated, the second interface control circuit 350 retrieves the signals containing in the start command byte-by-byte from the FIFO 351 and delivers the signals to the second interface connector 302. At the same time, the second interface control circuit 350 issues data clock signal pulses one at a time. The interface control circuit 204 in the ink-jet printer 200 enters the above-mentioned signals into the FIFO 351 in synchronism with the data clock signal.

The foregoing operation continues until the FIFO 351 in the print control apparatus 300 becomes empty or the FIFO 305 in the ink-jet printer 200 becomes full. The interface control circuit 204 notifies the CPU 206 of a fact that the signals are inputted to the FIFO 305. The CPU 206 successively retrieves the signals from the FIFO 205 and, when the start command of the signals is acknowledged, causes a mechanism control circuit (not shown) to drive the motor 267 to rotate the drum 269.

Next, in step S10, the second CPU 310 executes the program PM for the selected image enlarging/reducing manner M so as to perform the selected image enlarging/reducing manner M on the raster image data for one raster in the original image which are stored in the hard memory disk drive 309, to thereby produce raster image data representative of the enlarged or reduced original image (i.e., digital output image data for the one raster of the enlarged or reduced original image: which will be referred to as "enlarged/reduced raster image data", hereinafter). The second CPU 310 then inputs the enlarged/reduced raster image data to the dual port memory 308.

Then, the second CPU 310 sends a command or instruction that the first CPU 305 should read the enlarged/reduced raster image data from the dual port memory 308. The first CPU 305 (FIG. 2) places the enlarged/reduced raster image data into the first dynamic memory 306 and instructs the DMAC 314 to write the enlarged/reduced raster image data to the second interface circuit 350. In this instance, the necessary capacity of the first dynamic memory 306 is as large as the amount of the enlarged/reduced raster image data contained in one raster. This capacity is smaller than the usual capacity which is required to store enlarged/reduced raster image data of one page size. When FIFO 351 comes to the full load condition, the DMAC 314 stops or discontinues its writing operation. The writing operation of the DMAC 314 is resumed as soon as the FIFO 351 becomes empty. During the interruption of the direct memory transfer, the first CPU 305 is permitted to transfer the next line raster image data from the hard disk drive 309 to the second CPU 310 and to place the enlarged/reduced raster image data therefor into another area of the first dynamic memory 306. In addition, since the second CPU 310 is able to continue the image enlarging/reducing operation for the raster image data regardless of whether or not the bus 230 is occupied, a high speed processing is possible. When the DMAC 314 writes the enlarged/reduced raster image data to the FIFO 351, the enlarged or reduce raster image data is sent to the ink-jet printer 200 in the same manner as the delivery of the signals such as the start command described previously, and the CPU 206 temporarily places the enlarged/reduced raster image data in the dynamic memory 207.

The CPU 206 places only those enlarged/reduced raster image data components related to cyan successively to the fourth data memory 212 until entry of a one-raster amount of the cyan-related raster image data components is completed. Then, the CPU 206 gives a command or instruction to the data readout control circuit 208, initiating printing by one raster size. Upon receipt of the instruction, the data readout control circuit 208 supplies the content of the data memory 212 to the fourth head control circuit 216 in synchronism with the output signal of the encoder 266. The fourth head control circuit 216 determines an amount of driving of the ink-jet head 254 based on the content of the raster image data supplied and drives the ink-jet head 254 so that a controlled amount of ink is ejected from the ink-jet head 254 onto the paper 264. The amount of ink ejected from the head 254 is determined depending on the driving amount of the ink-jet head 254. Thus, one raster image of cyan is printed on the paper 264 retained on the drum 269. Then, the CPU 206 moves the ink-jet head 254 in the axial direction of the drum 264 by a one-raster distance, and after that the aforementioned operation is repeated to print out succeeding cyan raster images. When the ink-jet head 253 comes to the position of the first cyan raster, then a similar operation is achieved repeatedly in conjunction with those data related to magenta and cyan. If the necessary data is not held in the dynamic memory 207, the printing operation is suspended until the necessary data is supplied to the dynamic memory 207.

Thereafter, foregoing operation is also repeated with respect to yellow and black until the enlarged/reduced raster image data is fully outputted. During that time, the operation of the ink-jet heads 251, 252, 253, 254 is stopped successively in the reverse sequence of initiation. Namely, the ink-jet head 254 for cyan is stopped first and the ink-jet head 251 for black is last. Thus, a full-color printout is formed on the paper 264. A capacity requisite to the dynamic memory 207 in the ink-jet printer 200 is equal to product of data amount for one raster and the number of the maximum offset rasters to be formed on the print output. If the plurality of print heads are arranged in the drum rotating direction, the number of the offset rasters becomes 1. Accordingly, The capacity of the memory 207 of the present invention is made considerably small relative to full-page amount capacity of conventional raster image data memory but is enough to provide a printout of the same quality.

The above-described printing operation is repeatedly occurred while the raster image data for the respective ones of all the rasters of the original image are subjected to the selected image enlarging/reducing operation. As a result, a full color enlarged/reduced output image is obtained, and the printing operation is stopped in step S11 shown in FIG. 5.

As described above, according to the first embodiment, an image enlarging/reducing manner suitable for a magnification/reduction ratio value with which the original image is to be enlarged or reduced is selected, and the original image is subjected to the selected suitable image enlarging/reducing manner. Accordingly, it is possible to obtain a high quality enlarged or reduced image in a short period of time.

In the above-described description for the first embodiment, the number of the image enlarging/reducing programs PM stored in the hard memory disk drive 309 is two. However, three or more image enlarging/reducing programs PM may be stored in the hard memory disk drive 309. In such a case, two or more reference values N' may be necessary to be defined for selecting one out of the three or more image enlarging/reducing programs PM.

A second preferred embodiment of the present invention will be described hereinafter.

Similarly to the digital image processing device of the first embodiment, a digital image processing device of the second embodiment is provided with the plurality of image enlarging/reducing manners. In the digital image processing device of the second embodiment, a data amount based selecting unit is used in place of the magnification/reduction ratio-based selecting unit of the first embodiment. The data amount based selecting unit is adapted to select one of the plurality of image enlarging/reducing manners in accordance with the amount of the digital original image data and allow the selected one image enlarging/reducing manner to perform its own image enlarging/reducing operation. More specifically, in the case where the original image is small and therefore the amount of the digital original image data has a small value, the selecting unit selects the second image enlarging/reducing manner to allow the second image enlarging/reducing manner to elaborately enlarge or reduce the original image to produce the output image. In the case where the original image is large and therefore the amount of the digital original image data has a large value, on the other hand, the selecting unit selects the first image enlarging/reducing manner to allow the first image enlarging/reducing manner to roughly enlarge or reduce the large original image. The output image thus obtained by the selected image enlarging/reducing manner is outputted from the digital image processing device.

Thus, according to the digital image processing device of the present embodiment, the digital original image data are subjected to such an image enlarging/reducing processing as corresponds to the amount of the digital original image data. More specifically, the digital original image data are subjected to an image enlarging/reducing processing which is suited to obtain an output image of the obtainable most excellent quality within a desired short period of time. Accordingly, the digital image processing device can enlarge or reduce the original image having any size in a desired short period of time and produce an output image of good image quality.

An illustrative example of the digital image processing device of the second embodiment will be described hereinafter with reference to FIGS. 9 and 10. The example for the second embodiment is the image printing control device as shown in FIGS. 1 through 4, similarly to the example for the first embodiment. The image printing control device of this example is the same as that for the first embodiment, except for a data amount reading step Si' shown in FIG. 9, the number of the image enlarging/reducing operations M (i.e., the number of the image enlarging/reducing programs PM stored in the hard memory disk drive 309) and the image enlarging/reducing operation selecting program PS also stored in the hard memory disk drive 309.

Figure 9:
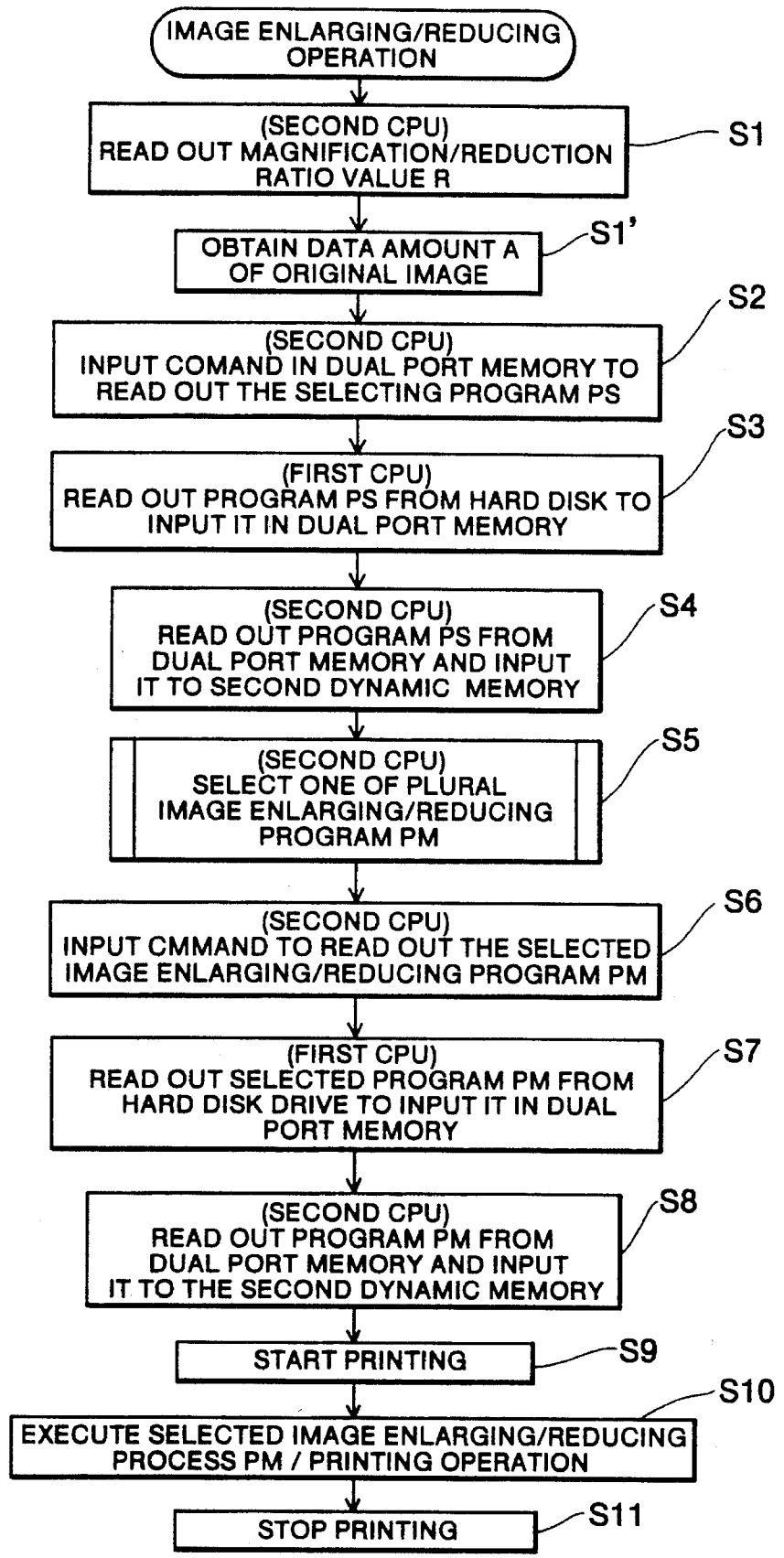
FIG. 9 illustrates the sequence of the image enlarging/reducing operation according to the second embodiment.

More specifically, the image enlarging/reducing operation performed in this example is shown in FIG. 9 and is the same as that of the first embodiment as shown in FIG. 5, except only for that the data amount reading step S1' is provided between the steps S1 and S2. In the data amount reading step S1', an amount A of the digital original image data of the original image which are stored in the hard disk drive 309 is calculated. In other words, an amount A of the raster image data for all the rasters of the print output of one page to be subjected to the image enlarging/reducing operation is calculated in step Si'.

In this example for the second embodiment, the number of the image enlarging/reducing operations M is two. That is, the program PM1 for the manner M1 of roughly enlarging or reducing the original image and the program PM2 for the manner M2 of elaborately enlarging or reducing the original image are stored in the hard memory disk drive 309. Similarly to the first embodiment, the manner M1 employs the linearly interpolating method shown in FIG. 7, and the manner M2 utilizes the interpolation method employing the spline curved surface of third order shown in FIG. 8.

Figure 10:
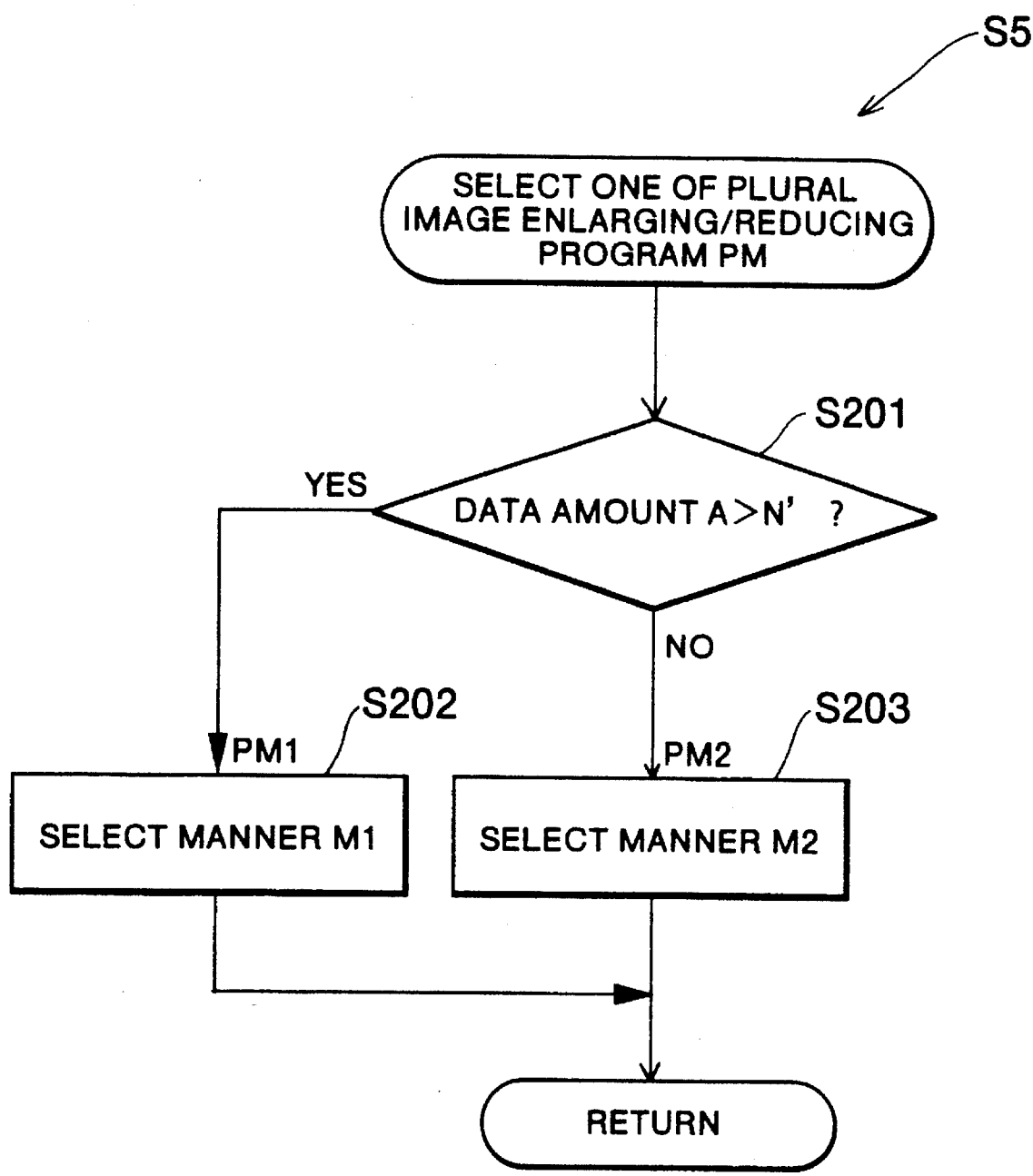
FIG. 10 illustrates the sequence of the image enlarging/reducing operation selecting process according to the second embodiment.

The image enlarging/reducing operation selecting program PS stored in the hard memory disk drive 309 of this example which is executed in the step S5 in FIG. 9 is shown in FIG. 10. In the image enlarging/reducing operation selecting step, one of the image enlarging/reducing manners M stored in the hard memory disk drive is selected in accordance with the amount A of the digital original image data of the original image. In the present embodiment, in place of the reference value N in the first embodiment, the selecting program PS defines therein another reference value N'. Accordingly, when the program PS is inputted to the second dynamic memory 311 in the step S4 shown in FIG. 9, the data of the reference value N' is also inputted into the second dynamic memory 311.

The reference value N' will be described hereinafter. In this illustration, an amount A of the digital original image data [byte] which are obtainable from a reference original image I through a reference input device D may be defined as the reference value N'. For example, if a photographic image having a service size (110 mm×80 mm) is defined as the reference original image I and if an image scanner having a resolution of 300 dpi (i.e., (8 [bit]/color)×3 [color components]) is defined as the reference input device D, the amount A of the digital original image data obtainable by the reference input device D is 3.6 [megabyte]. In this case, therefore, the reference value N' is defined as 3.6 [megabyte].

The image enlarging/reducing operation selecting step (step S5) will be described in great detail, with reference to FIG. 10. The second CPU 310 judges whether the data amount A of the actual original image to be enlarged or reduced is greater than the reference value N' in step S201. In the case where the amount A of the digital original image data is higher than the reference value N', it can be determined that if the digital original image data are subjected to the process PM2 for performing the manner M2 of elaborately enlarging/reducing the original image, the period of time required for enlarging/reducing the original image will become considerably large. Accordingly, the second CPU 310 determines in a step S202 to select the program PM1 for performing the manner M1 of roughly enlarging/reducing the original image. On the other hand, in the case where the amount A is equal to or lower than the reference value N', it can be determined that even if the digital original image data are subjected to the process PM2 for performing the manner M2 of elaborately enlarging/reducing the original image, the period of time required for enlarging/reducing the original image will not become so long. Accordingly, the second CPU 310 determines in a step S203 to select the process PM2.

As described above, according to the second embodiment, an image enlarging/reducing manner suitable for an amount of the digital original image data of the original image is selected, and the original image is subjected to the selected suitable image enlarging/reducing manner. Accordingly, it is possible to obtain a high quality enlarged or reduced image in a short period of time.

In the above-described description for the second embodiment, the number of the image enlarging/reducing processes PM stored in the hard memory disk drive 309 is two. However, three or more image enlarging/reducing processes PM may be stored in the hard memory disk drive 309. In such a case, two or more reference values N' may be necessary to be defined for selecting one out of the three or more image enlarging/reducing processes PM.

In the second embodiment, the data amount of the reference original image I is defined as the reference value N' for discriminating between original images of a first kind which are suitable for being roughly enlarged or reduced and original images of a second kind which are suitable for being elaborately enlarged or reduced. In other words, the reference value N' is utilized for selecting an optimum image enlarging/reducing operation M for an actual original image. However, other methods for selecting the optimum image enlarging/reducing operation M for the actual original image may be employed. For example, a value of the maximum period of time for the image enlarging/reducing operation may be defined. When an actual original image is to be enlarged or reduced, values of the period of time required for enlarging or reducing the original image through respective ones of the plural image enlarging/reducing manners M are estimated based on the data amount A of the actual original image. Then, one of the plural image enlarging/reducing manners M is selected which is estimated to enlarge or reduce the original image in such a period of time which has a value lower than that of the maximum period of time and which will most elaborately enlarge or reduce the original image. Employing this method can certainly produce an output image of good quality within a desired short period of time.

A digital image processing device according to a third preferred embodiment of the present invention will be described hereinafter.

Similarly to the digital image processing device of the first and second embodiments, a digital image processing device of the third embodiment is provided with the plurality of image enlarging/reducing manners. In the digital image processing device of the third embodiment, an original image kind based selecting unit is provided in place of the magnification/reduction ratio-based selecting unit of the first embodiment and the data amount based selecting unit of the second embodiment. The original image kind based selecting unit is adapted to select one of the plurality of image enlarging/reducing manners in accordance with a kind of the original image and allow the selected image enlarging/reducing manner to perform its own image enlarging/reducing operation. More specifically, the original image kind based selecting unit judges whether the original image corresponds to a first kind of image which has outlines of high definition or to a second kind of image which has outlines of low definition. In the case where the original image is judged to be the first kind of original, the selecting unit selects the first image enlarging/reducing manner to allow the first image enlarging/reducing manner to roughly enlarge or reduce the large original image to produce the output image. Since the original image of the type which has outlines of high definition is thus roughly enlarged or reduced to produce the output image, the output image can make an impression approximately the same as that of the original image. In the case where the original image is judged to be the second kind of original, on the other hand, the selecting unit selects the second image enlarging/reducing manner to allow the second image enlarging/reducing manner to elaborately enlarge or reduce the original image of the second kind to produce the output image. Since the original image of the type which has outlines of low definition is thus elaborately enlarged or reduced to produce the output image, the output image can make an impression approximately the same as that of the original image. The output image thus obtained by the selected image enlarging/reducing manner is outputted from the digital image processing device.

Accordingly, in the digital image processing device of the present embodiment, the digital original image data are subjected to such an image enlarging/reducing processing that is suitable for the kind of the original image. More specifically, the digital original image data are subjected to an image enlarging/reducing processing which is suited to obtain an output image which makes an impression the same as that of the original image. Accordingly, the digital image processing device can enlarge or reduce any type of original image and produce an output image of good image quality.

Figure 11:
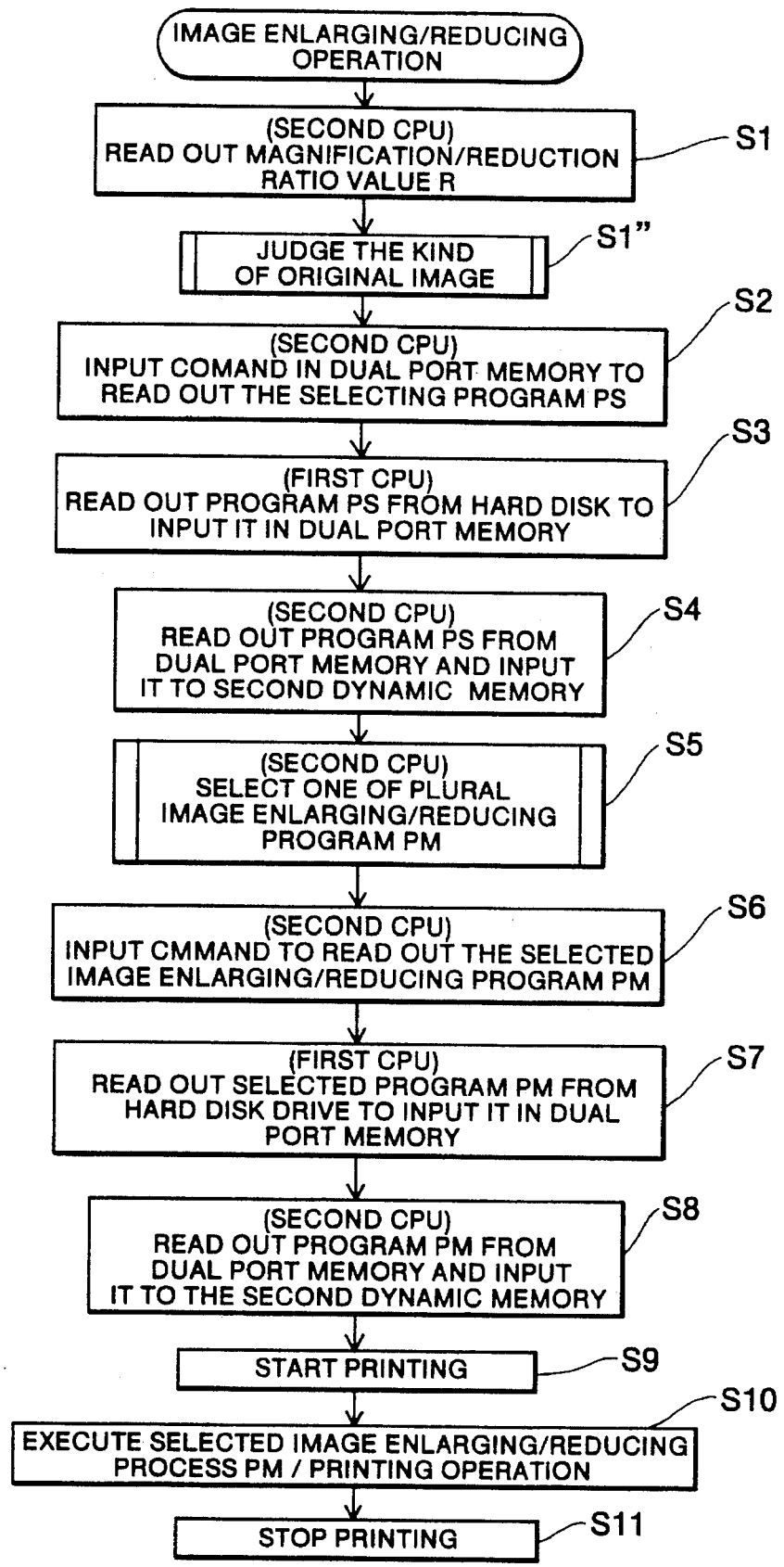
FIG. 11 illustrates the sequence of the image enlarging/reducing operation according to the third embodiment.
Figure 12:
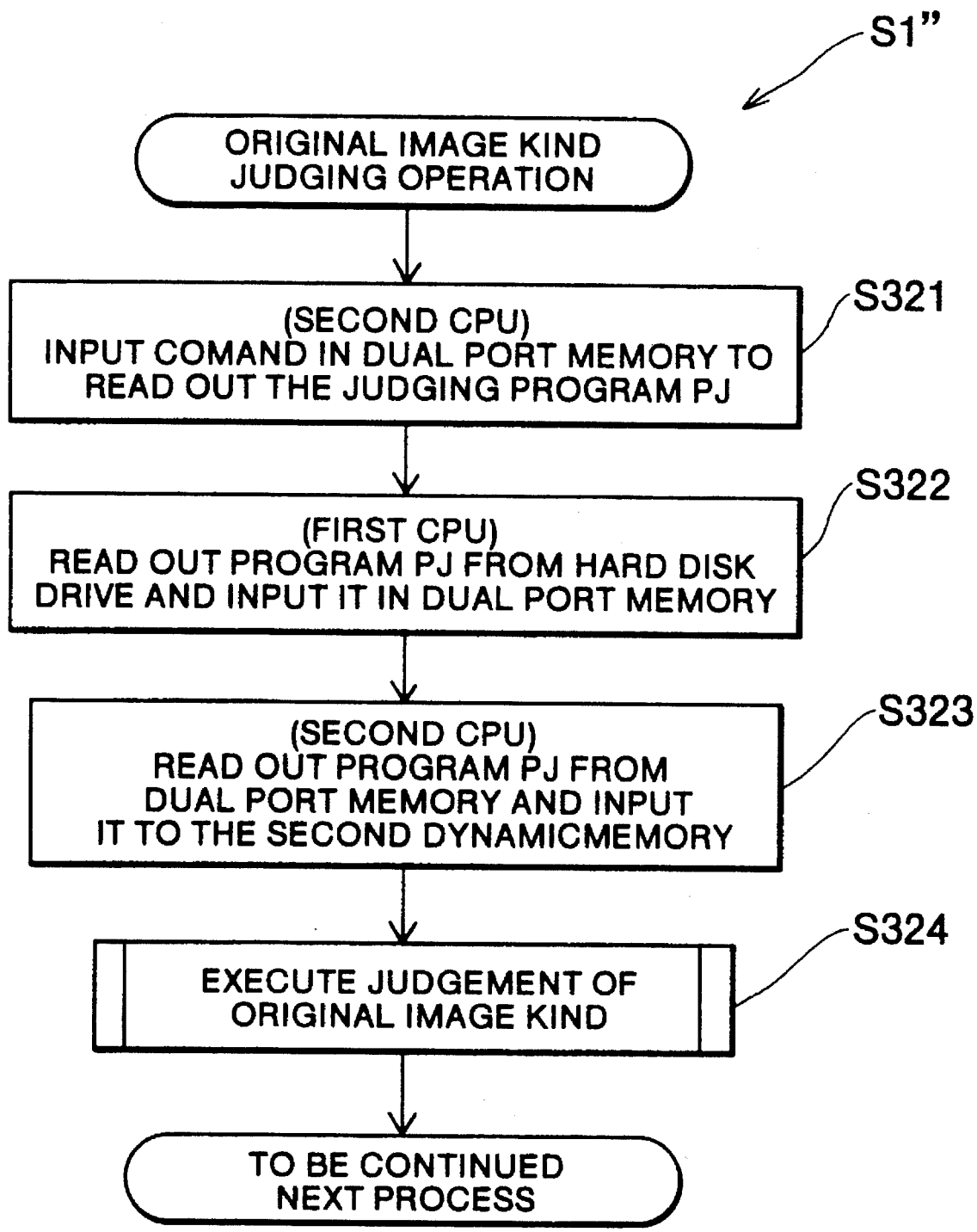
FIG. 12 illustrates the sequence of the original image kind judging operation according to the third embodiment.

An illustrative example of the digital image processing device of the third embodiment will be described hereinafter with reference to FIGS. 11 through 16. The example for the third embodiment is the image printing control device as shown in FIGS. 1 through 4, similarly to the examples for the first and second embodiments. The image printing control device of this example is the same as that for the second embodiment, except for the image enlarging/reducing operation selecting step S5 and except for a step S1" inserted between the steps S1 and S2, in place of step S1' of the second embodiment, for judging whether the original image is the illustration image having the large number of outlines of high definition or the natural image having the small number of outlines of low definition, as shown in FIG. 11. The step S1" will be described below with reference to FIG. 12, hereinafter.

In the image printing control device of this illustration, a program PJ for judging whether the original image is the illustration image or the natural image is stored in the hard memory disk drive 309. Accordingly, in the process Si", the second CPU 310 first inputs in the dual port memory 308 a command that instructs the first CPU 305 to read out the judging program PJ from the hard memory disk drive 309 in step S321. The first CPU 305 then reads out the command from the dual port memory 308, and reads out the judging program PJ from the hard disk memory drive 309 and inputs the program PJ to the dual port memory 308 in step S322.

The second CPU 310 then reads out the judging program PJ from the dual port memory 308 and inputs it in the second dynamic memory 311 in step S323. Then, the second CPU 310 executes the judging program PJ which is now stored in the second dynamic memory 311 in step S324.

The manner of judging whether the original image is the illustration image or the natural image employed in this example which is executed by the judging program PJ in the step S324 will be described below.

In this example, the number of colors distributed in a predetermined area in the original image is obtained, and it is judged whether the thus obtained number of colors is smaller than a reference value N" defined for this example. In the case where the obtained number of colors is smaller than the reference value N", it is determined that the original image is the illustration image. In the case where the obtained number of colors is equal to or larger than the reference value N", it is determined that the original image is the natural image. This is because in the illustration image such as the computer graphic image, a ratio of an area in the image at which each color is presented with respect to a total area of the image has a large value and therefore the number of colors distributed in the image generally has a small value. However, there is a possibility that some illustration image has a large number of colors distributed therein and therefore it will be judged that the number of colors distributed in the predetermined area of the illustration image is larger than the reference value N". In this case, the illustration image will be erroneously judged to be the natural image, and will be subjected to such an image enlarging/reducing operation suitable for the natural image. However, this type of illustration image has a large number of kinds of colors distributed in a large part thereof, and therefore the illustration image of this type has a small number of outlines distributed therein. Accordingly, the illustration image of this type may be preferably subjected to the image enlarging/reducing operation suitable for the natural image.

It is noted that the reference value N" should be determined dependently on the number of gradations representing the density of each picture element on the original image. For example, in the case where the density of each picture element of the original image is represented by 8 [bit]×3 color components (R, G, B or C, M, Y, or otherwise), the number of gradations representing density of each picture element has a value approximately of 16,700,000 (=256× 256×256). Accordingly, in this case, the reference value N" should preferably be 256.

Figure 13:
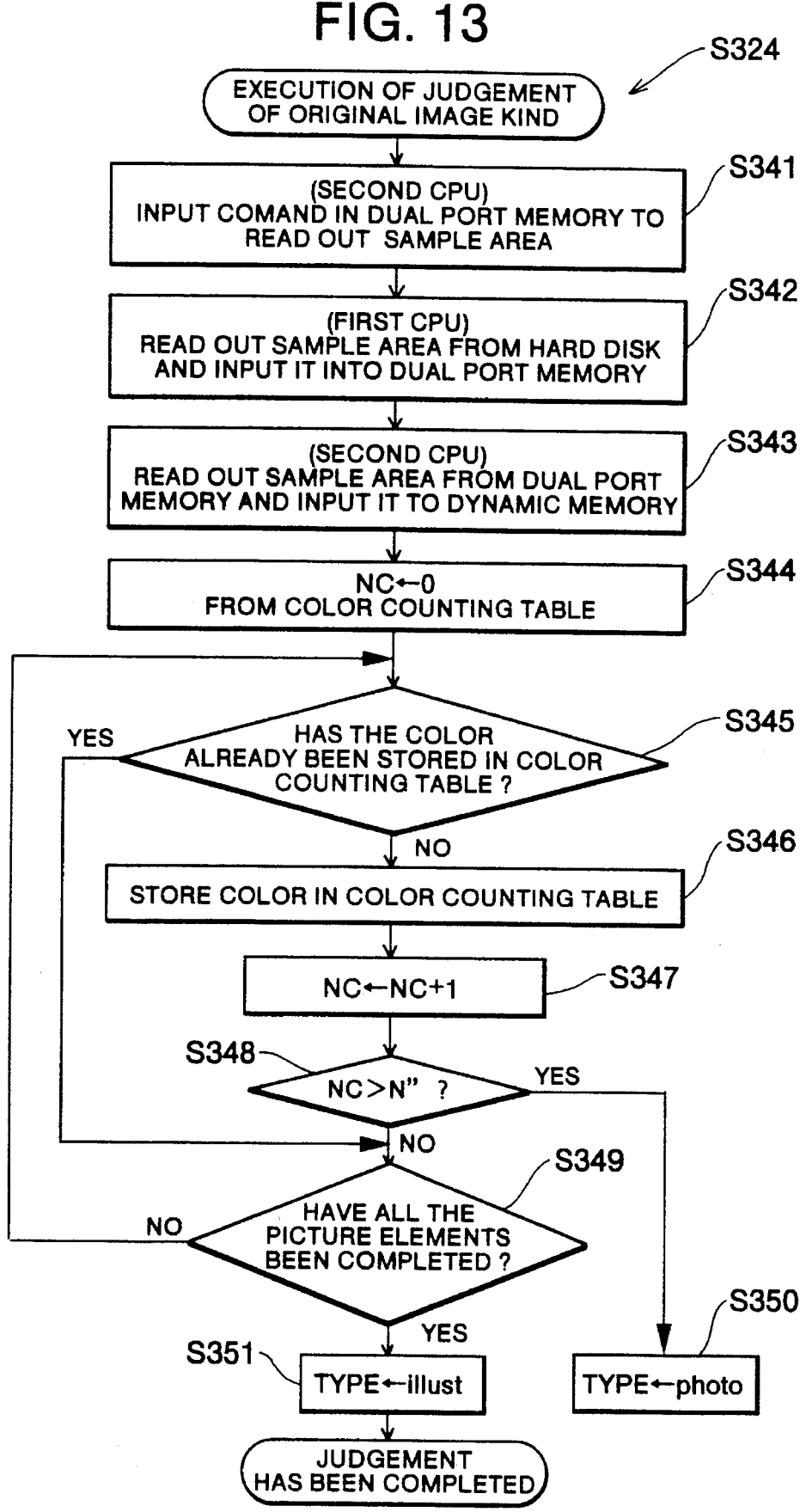
FIG. 13 illustrates, in greater detail, the sequence of the original image kind judging operation executing process accord to the third embodiment.

The judging process executing step S324 for judging whether the original image is the illustration image or the natural image in the above-described manner will be described hereinafter in greater detail, with reference to FIG. 13.

Figure 15:
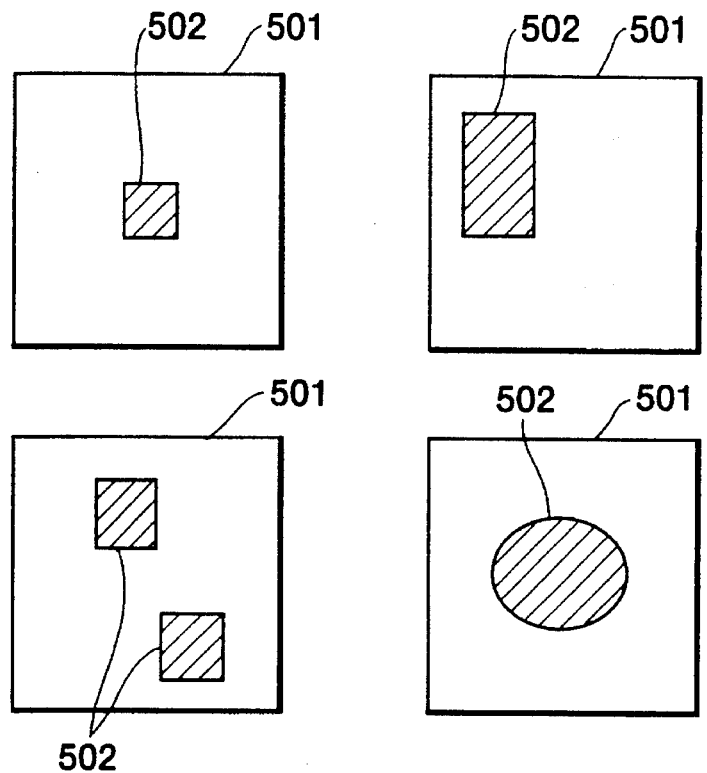
FIG. 15 illustrates examples of an area to be sampled from the original image.

In step S341, the second CPU 310 first inputs a command that instructs the first CPU 305 to sample an area 502 from the original image which is stored in the hard memory disk drive 309. More specifically, the second CPU 310 inputs a command that instructs the first CPU 305 to sample the digital original image data for the sample area 502 from the digital original image data for an entire area 501 of the original image which are stored in the hard disk memory 309. Four examples of the sample area 502 for the original image area 501 are illustrated in FIG. 15 as hatching portions. The sample area 502 should be positioned within an area of the original image 501. As shown in FIG. 15, the number of the sample areas 502 thus formed within the original image 501 may be freely selected. The position, the size and the shape of the sample area 502 can also be freely selected. It is noted, however, that the larger the area of the sample area 502, the longer the period of time required for judging whether the original image 501 is the natural image or the illustration image. Accordingly, the size of the sample area 502 should preferably be about one eighth of the total area of the original image 501.

In step S342, then, the first CPU 305 reads out the command now stored in the dual port memory 308, and reads out the digital original image data for the sampled area 502 and inputs them into the dual port memory 308. The second CPU 310 reads out the digital original image data thus inputted in the dual port memory 308 and inputs them into the second dynamic memory 311 in step S343.

Figure 16:
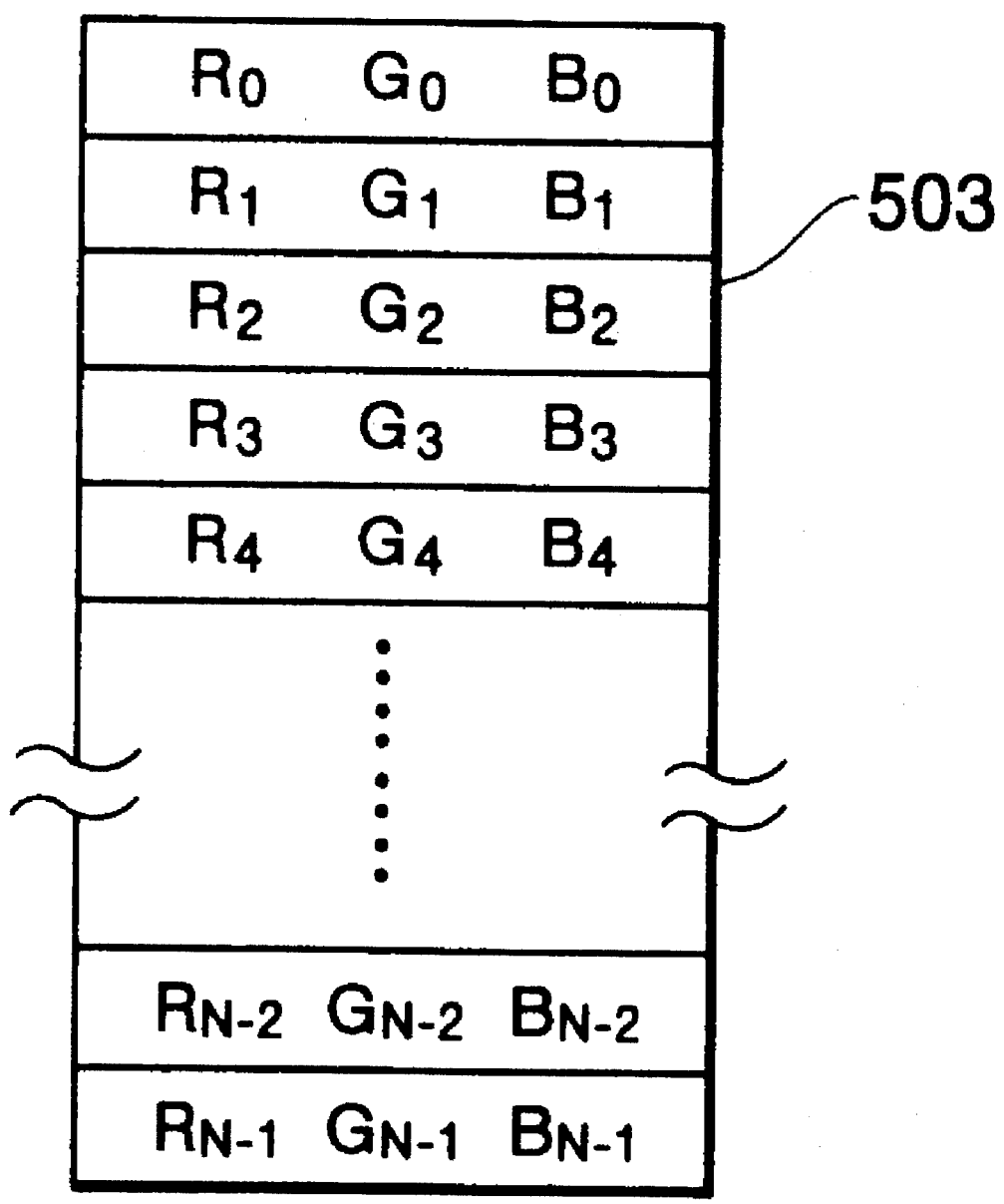
FIG. 16 illustrates an example of a color counting table used for counting the number of colors distributed in the area sampled from the original image.

The second CPU 310 then counts the number of colors distributed within the sample area 502 which are now stored in the second dynamic memory 311. In order to count the number of the colors, the second CPU 310 first sets a color counting variable NC to zero (0) in step S344. Simultaneously, the CPU forms a color counting table 503 in the second dynamic memory 311. The color counting table 503 will be used for storing therein the colors distributed in the sample area 502. An example of the color counting table 503 is shown in FIG. 16. The size of the example of the color counting table 503 shown in FIG. 16 may be determined by a product of the reference value N" and the number of color components representing color state of each picture element i.e., [reference value N"]×[the number of color components representing color state of each picture element].

Then, the second CPU performs the following processings on the digital original image data for all the picture elements in the sample area 502. In step S345, it is judged whether a digital original image data (color) for one picture element in the sample area 502 has been already inputted in the color counting table 503. If the digital original image data has not yet been stored in the table 503, the digital original image data is stored in the table 503 in step S346. In step S347, then, the color counting variable NC is incremented by 1 in step S347. If the digital original image data has already been stored in the table 503, on the other hand, the process proceeds to step S349. In step S348, then, the color counting variable NC is compared with the reference value N". If the color counting variable NC is larger than the reference value N", it is judged that the original image is a natural image. Accordingly, a fixed value "Photo" is substituted for a judging variable "TYPE", and consequently the original image kind judging process is completed in step S350. When the above-described processes are completed for the digital original image data of all the picture elements in the sample area 502, if the color counting variable NC does not exceed the reference value N", it is judged that the original image is an illustration image. In this case, a fixed value "Illust" is substituted for the judging variable "TYPE" in step S351.

Figure 14:
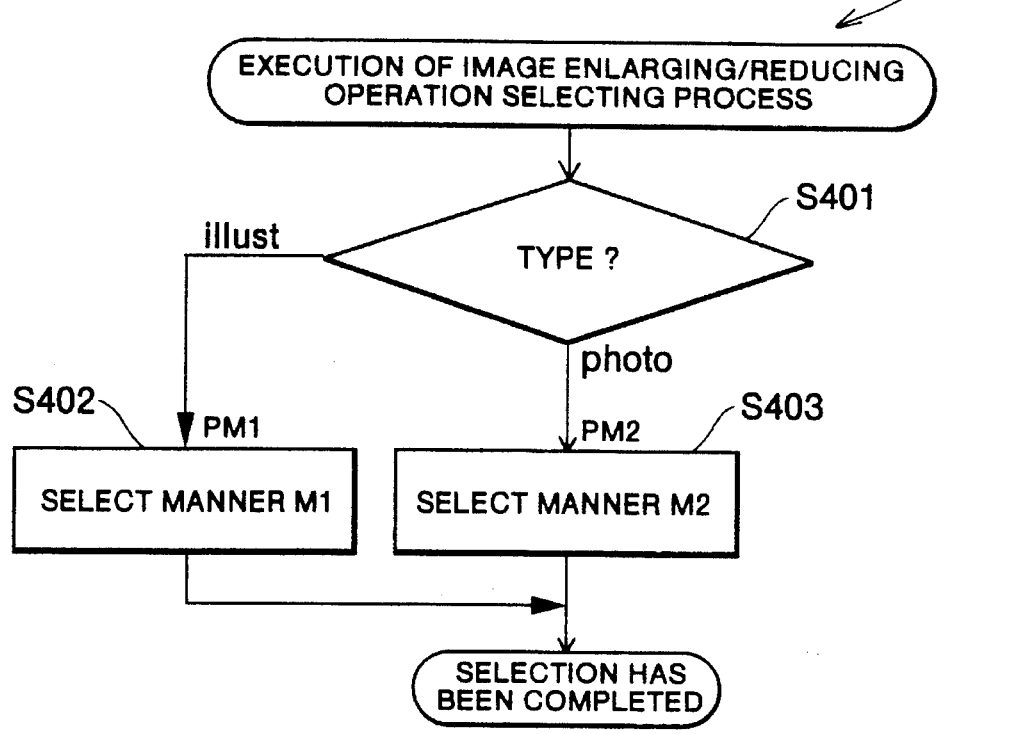
FIG. 14 illustrates the sequence of the image enlarging/reducing operation selecting process according to the third embodiment.

Now, with reference to FIG. 14, the image enlarging/reducing operation selecting step S5 in FIG. 1 which is executed by the program PS will be described in greater detail hereinafter. In the image enlarging/reducing operation selection executing process S5, the image enlarging/reducing operation suitable for the kind of the original image (the natural image or the illustration image) is selected. In the present embodiment, the program PM1 for the manner M1 of roughly enlarging or reducing the original image and the program PM2 for the manner M2 of elaborately enlarging or reducing the original image are stored in the hard memory disk drive 309 similarly in the second embodiment. Accordingly, if the original image is judged to be the natural image ("TYPE"=Photo) in step S401, the manner M2 is selected in step S403. On the other hand, if the original image is judged to be the illustration image ("TYPE"=Illust) in step S401, the manner M1 is selected in step S402.

As described above, according to the third embodiment, an image enlarging/reducing manner suitable for a kind of the original image is selected, and the original image is subjected to the selected suitable image enlarging/reducing manner. Accordingly, it is possible to obtain a high quality enlarged or reduced image.

In the above description, the number of colors distributed in the sample area 502 in the original image 501 is counted for judging whether the original image is the natural image or the illustration image. However, in order to judge whether the original image is the natural image or the illustration image, the original image may be subjected to Fourier transformation. If the Fourier transformed original image has a large number of low-frequency components, it can be judged that the original image is the illustration image. If the Fourier transformed original image has a large number of high-frequency components, it can be judged that the original image is the natural image.

In the above description, the original image is judged to be either one of two kinds of images (a natural image and an illustration image). However, the original image may be judged to be one among three or more kinds of images. In such a case, programs PM1, PM2, PM3, . . . for three or more image enlarging/reducing manners M1, M2, M3, . . . which are respectively suitable for enlarging or reducing the three or more kinds of the images should be stored in the hard memory disk drive 309.

Although certain preferred embodiments of the present invention have been shown and described in detail, it should be understood that various changes and modifications may be made therein without departing from the scope of the appended claims.

For example, the printer used in the preferred embodiments of the invention may be replaced by a thermoelectric printer or a video display unit. Further, the hard disk drive may be substituted by a magnetooptic disk unit, a floppy disk or a tape drive unit.

As the image enlarging/reducing operation M1 for roughly enlarging/reducing the original image, not only the operation employing the linearly interpolating method but also an operation employing the simple interpolating method may be applied. As the image enlarging/reducing operation M2 for elaborately enlarging/reducing the original image, not only the interpolation method with the spline curved surface of third order but also an operation employing an interpolation method with a polynominal curved surface of low or high order and an operation employing an interpolation method with a rational curved surface may be applied. Other various method may be applied In the above-described embodiments, the present invention is applied to a print controller of a type which receives the digital original image data from the computer. However, the present invention can also be applied to such a print controller as previously stores therein the digital original image data in its hard disk memory 309.

I claim:

1. A digital image processing device for enlarging or reducing an actual original image, said digital image processing device comprising:

input means for receiving actual digital original image data representative of an actual original image and a value of a desired magnification/reduction ratio from all possible magnification/reduction ratios with which the actual original image is to be enlarged or reduced;

store means for storing a plurality of different image enlarging/reducing manners of processing digital original image data representative of an original image which are inputtable by said input means to thereby achieve enlargement or reduction of the original image with the value of the desired magnification/reduction ratio input by said input means;

selection means for automatically selecting one of the plurality of different image enlarging/reducing manners in accordance with data of information on at least one of the input desired magnification/reduction ratio value and the actual original image; and image enlarging/reducing means for processing the actual digital original image data with the selected one of the plurality of different image enlarging/reducing manners to thereby enlarge or reduce the actual original image with the input desired magnification/reduction ratio value, wherein said selection means includes:

judge means for judging which one of the plurality of different image enlarging/reducing manners is consistent with the data of information on at least one of the desired magnification/reduction ratio value and the actual original image; and manner selection means for selecting the one of the plurality of different image enlarging/reducing manners consistent with the data of information on at least one of the desired magnification/reduction ratio value and the actual original image.

2. A digital image processing device for enlarging or reducing an actual original image, said digital image processing device comprising:

input means for receiving actual digital original image data representative of an actual original image and a value of a desired magnification/reduction ratio from all possible magnification/reduction ratios with which the actual original image is to be enlarged or reduced;

store means for storing a plurality of different image enlarging/reducing manners of processing digital original image data representative of an original image which are inputtable by said input means to thereby achieve enlargement or reduction of the original image with the value of the desired magnification/reduction ratio input by said input means;

selection means for automatically selecting one of the plurality of different image enlarging/reducing manners in accordance with data of information on at least one of the input desired magnification/reduction ratio value and the actual original image; and image enlarging/reducing means for processing the actual digital original image data with the selected one of the plurality of different image enlarging/reducing manners to thereby enlarge or reduce the actual original image with the input desired magnification/reduction ratio value, wherein the plurality of different image enlarging/reducing manners respectively correspond to a plurality of data of information on the magnification/reduction ratio, and said selection means selects one of said plurality of different image enlarging/reducing manners in accordance with data of information on the desired magnification/reduction ratio value and said selection means includes:

judge means for judging which one of the plurality of data of information on the magnification/reduction ratio corresponding to the plurality of different image enlarging/reducing manners is consistent with the information on the desired magnification/reduction ratio value; and manner selection means for selecting one of the plurality of different image enlarging/reducing manners corresponding to the data of information on the magnification/reduction ratio which is consistent with the data of information on the desired magnification/reduction ratio value.

3. A digital image processing device as claimed in claim 2, wherein said plurality of different image enlarging/reducing manners include at least a first image enlarging/reducing manner of enlarging or reducing the original image and a second image enlarging/reducing manner of enlarging or reducing the original image which is more complicated relative to the first image enlarging/reducing manner to thereby more elaborately enlarge or reduce the original image in comparison with the first image enlarging/reducing manner, wherein said judge means includes comparison means for comparing the value of desired magnification/reduction ratio with a reference value, and wherein said manner selection means selects the first image enlarging/reducing manner where the value of desired magnification/reduction ratio is lower than the reference value and selects the second image enlarging/reducing manner where the value of desired magnification/reduction ratio is equal to or higher than the reference value.

4. A digital image processing device as claimed in claim 3, wherein the first image enlarging/reducing manner employs at least one of a linear interpolation method and a simple interpolating method, and the second enlarging/reducing manner employs at least one of an interpolation method with a spline curved surface of third order, an interpolation method with a polynominal curved surface of low order, an interpolation method with a polynominal curved surface of high order and an interpolation method with a rational curved surface.

5. A digital image processing device as claimed in claim 4, wherein the first image enlarging/reducing manner employs a linear interpolation method, and the second enlarging/reducing manner employs an interpolation method with a spline curved surface of third order.

6. A digital image processing device for enlarging or reducing an actual original image, said digital image processing device comprising:

input means for receiving actual digital original image data representative of an actual original image and a value of a desired magnification/reduction ratio from all possible magnification/reduction ratios with which the actual original image is to be enlarged or reduced;

stored means for storing a plurality of different image enlarging/reducing manners of processing digital original image data representative of an original image which are inputtable by said input means to thereby achieve enlargement or reduction of the original image with the value of the desired magnification/reduction ratio input by said input means;

selection means for automatically selecting one of the plurality of different image enlarging/reducing manners in accordance with data of information on at least one of the input desired magnification/reduction ratio value and the actual original image; and image enlarging/reducing means for processing the actual digital original image data with the selected one of the plurality of different image enlarging/reducing manners to thereby enlarge or reduce the actual original image with the input desired magnification/reduction ratio value, wherein the plurality of different image enlarging/reducing manners respectively correspond to a plurality of data of information on the original image, and said selection means selects one of said plurality of different image enlarging/reducing manners in accordance with data of information on the actual original image and said selection means includes:

judge means for judging which one of the plurality of data of information on the original image corresponding to the plurality of different image enlarging/reducing manners is consistent with the data of information on the actual original image; and manner selection means for selecting one of the plurality of different image enlarging/reducing manners corresponding to the data of information on the original image which is consistent with the data of information on the actual original image.

7. A digital image processing device as claimed in claim 6, wherein the data of information on the original image corresponding to each of the plurality of different image enlarging/reducing manners includes an amount of the digital original image data for the original image, and wherein the data of information on the actual original image includes an actual amount of the actual digital original image data for the actual original image.

8. A digital image processing device as claimed in claim 7, wherein said plurality of different image enlarging/reducing manners include at least a first image enlarging/reducing manner of enlarging or reducing the original image and a second image enlarging/reducing manner of enlarging or reducing the original image which is more complicated than the first image enlarging/reducing manner to thereby more elaborately enlarge or reduce the original image in comparison with the first image enlarging/reducing manner, wherein said judge means includes comparison means for comparing the amount of the actual digital original image data with a reference amount, and wherein said manner selection means selects the first image enlarging/reducing manner where the amount of the actual original image data is higher than the reference amount and selects the second image enlarging/reducing manner where the amount of the actual original image data is equal to or lower than the reference amount.

9. A digital image processing device as claimed in claim 8, wherein the first image enlarging/reducing manner employs at least one of a linear interpolation method and a simple interpolating method, and the second enlarging/reducing manner employs at least one of an interpolation method with a spline curved surface of third order, an interpolation method with a polynominal curved surface of low order, an interpolation method with a polynominal curved surface of high order and an interpolation method with a rational curved surface.

10. A digital image processing device as claimed in claim 9, wherein the first image enlarging/reducing manner employs a linear interpolation method, and the second enlarging/reducing manner employs an interpolation method with a spline curved surface of third order.

11. A digital image processing device as claimed in claim 6, wherein the data of information on the original image corresponding to each of the plurality of different image enlarging/reducing manners includes a kind of the original image which is determined dependently on definition of an outline presented in the original image, and wherein the data of information on the actual original image includes a kind of the actual original image which is determined dependently on definition of an outline presented in the actual original image.

12. A digital image processing device as claimed in claim 11, wherein said plurality of different image enlarging/reducing manners include at least a first image enlarging/reducing manner of enlarging or reducing the original image and a second image enlarging/reducing manner of enlarging or reducing the original image which is more complicated than the first image enlarging/reducing manner to thereby more elaborately enlarge or reduce the original image in comparison with the first image enlarging/reducing manner, wherein said judge means judges whether the kind of the actual original image corresponds to a natural image which has an outline having low definition and an illustration image which has an outline having high definition, and wherein said manner selection means selects the first image enlarging/reducing manner where the kind of the actual original image is judged to be the illustration image and selects the second image enlarging/reducing manner where the kind of the actual original image is judged to be the natural image.

13. A digital image processing device as claimed in claim 12, wherein said judge means includes:

color number comparing means for comparing a number of colors distributed in an area sampled from the actual original image with a reference number; and kind determination means for determining that the kind of the actual original image is the natural image where the number of colors is higher than the reference number and that the kind of the actual original image is the illustration image where the number of colors is equal to or lower than the reference number.

14. A digital image processing device as claimed in claim 12, wherein the first image enlarging/reducing manner employs at least one of a linear interpolation method and a simple interpolating method, and the second enlarging/reducing manner employs at least one of an interpolation method with a spline curved surface of third order, an interpolation method with a polynominal curved surface of low order, an interpolation method with a polynominal curved surface of high order and an interpolation method with a rational curved surface.

15. A digital image processing device as claimed in claim 14, wherein the first image enlarging/reducing manner employs a linear interpolation method, and the second enlarging/reducing manner employs an interpolation method with a spline curved surface of third order.

16. A digital image processing device for enlarging or reducing an original image, based on digital original image data representative of the original image, said digital original image data including density data representative of density values of a multiplicity of picture elements of the original image which are arranged in rows and columns that are perpendicular to each other, said digital image processing device comprising:

input means for receiving digital original image data representative of an original image and a value of a desired magnification/reduction ratio from all possible magnification/reduction ratios with which the original image is to be enlarged or reduced;

means for using any one of a plurality of different image enlarging/reducing manners for processing the digital original image data in manners different from one another, to thereby achieve enlargement or reduction of the original image with the desired magnification/reduction ratio value input by said input means; and selection means for automatically selecting one of said plurality of different image enlarging/reducing manners for use in accordance with at least one of the input desired magnification/reduction ratio value and information on the original image to thereby allow the selected one of said plurality of different image enlarging/reducing manners to process the digital original image data to thereby enlarge or reduce the original image with the desired magnification/reduction ratio value, wherein said plurality of different image enlarging/reducing manners include at least a first image enlarging/reducing manner for processing the digital original image data and a second image enlarging/reducing manner for processing the digital original image data, the first image enlarging/reducing manner being simpler than the second image enlarging/reducing manner to thereby more roughly enlarge or reduce the original image in a shorter period of time in comparison with the second image enlarging/reducing manner, and said selection means includes:

comparison means for comparing the value of desired magnification/reduction ratio with a reference value; and unit selection means for selecting the first image enlarging/reducing manner where the value of desired magnification/reduction ratio is lower than the reference value and for selecting the second image enlarging/reducing manner where the value of desired magnification/reduction ratio is equal to or higher than the reference value.

17. A digital image processing device as claimed in claim 16, wherein the first image enlarging/reducing manner employs one of a linear interpolation method and a simple interpolating method, and the second enlarging/reducing manner employs one of an interpolation method with a spline curved surface of third order, an interpolation method with a polynominal curved surface of low order, an interpolation method with a polynominal curved surface of high order and an interpolation method with a rational curved surface.

18. A digital image processing device for enlarging or reducing an original image, based on digital original image data representative of the original image, said digital original image data including density data representative of density values of a multiplicity of picture elements of the original image which are arranged in rows and columns that are perpendicular to each other, said digital image processing device comprising:

input means for receiving digital original image data representative of an original image and a value of a desired magnification/reduction ratio from all possible magnification/reduction ratios with which the original image is to be enlarged or reduced;

means for using any one of a plurality of different image enlarging/reducing manners for processing the digital original image data in manners different from one another, to thereby achieve enlargement or reduction of the original image with the desired magnification/ reduction ratio value input by said input means; and selection means for automatically selecting the one of said plurality of different image enlarging/reducing manners for use in accordance with at least one of the input desired magnification/reduction ratio value and information on the original image to thereby allow the selected one of said plurality of different image enlarging/reducing manners to process the digital original image data to thereby enlarge or reduce the original image with the desired magnification/reduction ratio value, wherein the information on the original image includes an amount of the digital original image data, said plurality of different image enlarging/reducing manners include at least a first image enlarging/reducing manner for processing the digital original image data and a second image enlarging/reducing manner for processing the digital original image data, the first image enlarging/reducing manner being simpler than the second image enlarging/reducing manner to thereby more roughly enlarge or reduce the original image in a shorter period of time in comparison with the second image enlarging/reducing manner, and said selection means includes:

comparison means for comparing the amount of the digital original image data with a reference amount; and unit selection means for selecting the first image enlarging/reducing manner where the amount of the digital original image data is higher than the reference amount and for selecting the second image enlarging/reducing manner where the amount of the digital original image data is equal to or lower than the reference amount.

19. A digital image processing device as claimed in claim 18, wherein the first image enlarging/reducing manner employs one of a linear interpolation method and a simple interpolating method, and the second enlarging/reducing manner employs one of an interpolation method with a spline curved surface of third order, an interpolation method with a polynominal curved surface of low order, an interpolation method with a polynominal curved surface of high order and an interpolation method with a rational curved surface.

20. A digital image processing device for enlarging or reducing an original image, based on digital original image data representative of the original image, said digital original image data including density data representative of density values of a multiplicity of picture elements of the original image which are arranged in rows and columns that are perpendicular to each other, said digital image processing device comprising:

input means for receiving digital original image data representative of an original image and a value of a desired magnification/reduction ratio from all possible magnification/reduction ratios with which the original image is to be enlarged or reduced;

means for using any one of a plurality of different image enlarging/reducing manners for processing the digital original image data in manners different from one another, to thereby achieve enlargement or reduction of the original image with the desired magnification/ reduction ratio value input by said input means; and selection means for automatically selecting the one of said plurality of different image enlarging/reducing manners for use in accordance with at least one of the input desired magnification/reduction ratio value and information on the original image to thereby allow the selected one of said plurality of different image enlarging/reducing manners to process the digital original image data to thereby enlarge or reduce the original image with the desired magnification/reduction ratio value, wherein the information on the original image includes a number of colors distributed in an area sampled from the original image, and said plurality of different image enlarging/reducing manners include at least a first image enlarging/reducing manner for processing the digital original image data and a second image enlarging/reducing manner for processing the digital original image data, the first image enlarging/reducing manner being simpler than the second image enlarging/reducing manner to thereby more roughly enlarge or reduce the original image in a shorter period of time in comparison with the second image enlarging/reducing manner, and said selection means includes:

color number comparing means for comparing the number of colors distributed in the area sampled from the original image with a reference number; and unit selection means for selecting the first image enlarging/reducing manner where the number of colors is equal to or lower than a reference number and for selecting the second image enlarging/reducing unit where the number of colors is higher than the reference number.

21. A digital image processing device as claimed in claim 20, wherein the first image enlarging/reducing manner employs one of a linear interpolation method and a simple interpolating method, and the second enlarging/reducing manner employs one of an interpolation method with a spline curved surface of third order, in interpolation method with a polynominal curved surface of low order, an interpolation method with a polynominal curved surface of high order and an interpolation method with a rational curved surface.

22. A digital image processing device for enlarging or reducing an original image, based on digital original image data representative of the original image, said digital original image data including density data representative of density values of a multiplicity of picture elements of the original image which are arranged in rows and columns that are perpendicular to each other, said digital image processing device comprising:

store means for storing digital original image data representative of an original image;

input means for receiving a value of a desired magnification/reduction ratio from all possible magnification/reduction ratios with which the original image is to be enlarged or reduced;

a plurality of different image enlarging/reducing manners for processing the digital original image data in manners different from one another, to thereby achieve enlargement or reduction of the original image with the desired magnification/reduction ratio value input by said input means, the plurality of different image enlarging/reducing manners including at least a first image enlarging/reducing manner for processing the digital original image data and a second image enlarging/reducing manner for processing the digital original image data, the first image enlarging/reducing manner being simpler than the second image enlarging/reducing manner to thereby more roughly enlarge or reduce the original image in a shorter period of time in comparison with the second image enlarging/reducing manner; and selection means for automatically selecting one of said plurality of different image enlarging/reducing manners in accordance with at least one of the input desired magnification/reduction ratio value and information on the original image to thereby allow the selected one of said plurality of different image enlarging/reducing manners to process the digital original image data to thereby enlarge or reduce the original image with the input desired magnification/reduction ratio value.

23. An image forming system for receiving an original image, enlarging or reducing the original image and outputting the enlarged or reduced original image, said image forming system comprising:

input means for receiving digital original image data representative of an original image and a value of a desired magnification/reduction ratio from all possible magnification/reduction ratios with which the original image is to be enlarged or reduced;

means for using one of a plurality of different image enlarging/reducing manners for processing the digital original image data in manners different from one another, to thereby achieve enlargement or reduction of the original image with the desired magnification/reduction ratio value, the plurality of different image enlarging/reducing manners including at least a first image enlarging/reducing manner for processing the digital original image data and a second image enlarging/reducing manner for processing the digital original image data, the first image enlarging/reducing manner being simpler than the second image enlarging/reducing manner to thereby more roughly enlarge or reduce the original image in a shorter period of time in comparison with the second image enlarging/reducing manner; and selection means for automatically selecting the one of said plurality of different image enlarging/reducing manners for use in accordance with information on at least one of the original image and the desired magnification/reduction ratio value to thereby allow the selected one of said plurality of different image enlarging/reducing manners to process the digital original image data to thereby enlarge or reduce the original image with the desired magnification/reduction ratio value and output an enlargement or reduction of the original image.

* * * * *